(12) United States Patent (10) Patent No.: US 8,713,195 B2
Pickens et al. (45) Date of Patent: Apr. 29, 2014

(54) METHOD AND SYSTEM FOR STREAMING DIGITAL VIDEO CONTENT TO A CLIENT IN A DIGITAL VIDEO NETWORK

(75) Inventors: John Pickens, Newark, CA (US); Kirk Blattman, Santa Rosa, CA (US); W. Paul Sherer, Danville, CA (US)

(73) Assignee: Cisco Technology, Inc., San Jose, CA (US)

( * ) Notice: Subject to any disclaimer, the term of this patent is extended or adjusted under 35 U.S.C. 154(b) by 1765 days.

(21) Appl. No.: 11/673,484

(22) Filed: Feb. 9, 2007

(65) Prior Publication Data

US 2007/0192812 A1 Aug. 16, 2007

Related U.S. Application Data

(63) Continuation-in-part of application No. 11/360,078, filed on Feb. 23, 2006.

(60) Provisional application No. 60/772,061, filed on Feb. 10, 2006.

(51) Int. Cl.
*G06F 15/16* (2006.01)

(52) U.S. Cl.
USPC .......................................... 709/232; 709/231

(58) Field of Classification Search
USPC .......... 709/217–219, 223, 225–226, 231–232
See application file for complete search history.

(56) References Cited

U.S. PATENT DOCUMENTS

| | | |
|---|---|---|
| 2,510,397 A | 6/1950 | Hansell |
| 2,915,652 A | 12/1959 | Hatsopoulous |
| 3,021,472 A | 2/1962 | Hernqvist |
| 3,118,107 A | 1/1964 | Gabor |
| 3,169,200 A | 2/1965 | Huffman |
| 3,173,032 A | 3/1965 | Maynard |
| 3,194,989 A | 7/1965 | Garbuny |

(Continued)

FOREIGN PATENT DOCUMENTS

| | | |
|---|---|---|
| DE | 4025618 A1 | 2/1992 |
| EP | 1 119 134 A2 | 7/2001 |

(Continued)

OTHER PUBLICATIONS

Non-Final Office Action for U.S. Appl. No. 11/360,078, 33 pages (May 27, 2009).

(Continued)

*Primary Examiner* — Hussein A. Elchanti

(74) *Attorney, Agent, or Firm* — Merchant & Gould P.C.

(57) ABSTRACT

A technique for streaming digital video content to a client involves providing a new stream of digital video content to the client using forward error correction (FEC) for a limited initial period and then ending the use of FEC after the limited initial period has ended. In an embodiment, during the limited initial period, the digital video content is provided to the client at a rate that is slightly higher than the playout rate in order to allow a client buffer to accumulate digital video content. FEC continues to be used until the client buffer is sufficiently populated such that lost or damaged frames can be retransmitted to the client before the corresponding digital video content is needed for playout. Once the client buffer is sufficiently populated, FEC is ended and retransmission is used to maintain the quality of the streamed digital video content.

27 Claims, 21 Drawing Sheets

(56) References Cited

U.S. PATENT DOCUMENTS

| | | |
|---|---|---|
| 3,238,395 A | 3/1966 | Sense |
| 3,239,745 A | 3/1966 | Hernqvist |
| 3,267,307 A | 8/1966 | Fox |
| 3,267,308 A | 8/1966 | Hernqvist |
| 3,281,372 A | 10/1966 | Haas |
| 3,300,660 A | 1/1967 | Bensimon |
| 3,328,611 A | 6/1967 | Davis |
| 3,376,437 A | 4/1968 | Mayerand, Jr. et al. |
| 3,393,330 A | 7/1968 | Vary |
| 3,470,393 A | 9/1969 | Moncorge |
| 3,515,908 A | 6/1970 | Caldwell |
| 3,519,854 A | 7/1970 | Davis |
| 3,578,992 A | 5/1971 | Shimada |
| 3,600,933 A | 8/1971 | Johnston |
| 3,740,592 A | 6/1973 | Engdahl et al. |
| 3,821,462 A | 6/1974 | Kaufman et al. |
| 3,843,896 A | 10/1974 | Rason et al. |
| 3,992,885 A | 11/1976 | Forster |
| 4,004,210 A | 1/1977 | Yater |
| 4,011,582 A | 3/1977 | Cline et al. |
| 4,039,352 A | 8/1977 | Marinescu |
| 4,063,965 A | 12/1977 | Cline et al. |
| 4,097,752 A | 6/1978 | Wulf et al. |
| 4,148,192 A | 4/1979 | Cummings |
| 4,188,571 A | 2/1980 | Brunson |
| 4,199,713 A | 4/1980 | Förster |
| 4,224,461 A | 9/1980 | Snyder, Jr. et al. |
| 4,281,280 A | 7/1981 | Richards |
| 4,373,142 A | 2/1983 | Morris |
| 4,410,951 A | 10/1983 | Nakamura |
| 4,423,347 A | 12/1983 | Kleinschmidt |
| 4,667,126 A | 5/1987 | Fitzpatrick |
| 4,880,975 A | 11/1989 | Nishioka et al. |
| 4,928,030 A | 5/1990 | Culp |
| 4,937,489 A | 6/1990 | Hattori |
| 4,958,201 A | 9/1990 | Mimura |
| 5,028,835 A | 7/1991 | Fitzpatrick |
| 5,049,775 A | 9/1991 | Smits |
| 5,068,535 A | 11/1991 | Rabalais |
| 5,083,056 A | 1/1992 | Kondou |
| 5,119,151 A | 6/1992 | Onda |
| 5,229,320 A | 7/1993 | Ugajin |
| 5,233,205 A | 8/1993 | Usagawa |
| 5,235,803 A | 8/1993 | Rodgers |
| 5,247,223 A | 9/1993 | Mori |
| 5,307,311 A | 4/1994 | Sliwa, Jr. |
| 5,309,056 A | 5/1994 | Culp |
| 5,323,737 A | 6/1994 | Farrell |
| 5,327,038 A | 7/1994 | Culp |
| 5,332,952 A | 7/1994 | Ugajin |
| 5,336,547 A | 8/1994 | Kawakita et al. |
| 5,351,412 A | 10/1994 | Furuhata |
| 5,356,484 A | 10/1994 | Yater |
| 5,371,388 A | 12/1994 | Oda |
| 5,399,930 A | 3/1995 | Culp |
| 5,410,166 A | 4/1995 | Kennel |
| 5,465,021 A | 11/1995 | Visscher |
| 5,487,790 A | 1/1996 | Yasuda |
| 5,503,963 A | 4/1996 | Bifano |
| 5,521,735 A | 5/1996 | Shimizu |
| 5,592,042 A | 1/1997 | Takuchi |
| 5,625,245 A | 4/1997 | Bass |
| 5,675,972 A | 10/1997 | Edelson |
| 5,699,668 A | 12/1997 | Cox |
| 5,699,772 A | 12/1997 | Yonekawa et al. |
| 5,701,043 A | 12/1997 | Razzaghi |
| 5,722,242 A | 3/1998 | Edelson |
| 5,810,980 A | 9/1998 | Edelson |
| 5,874,039 A | 2/1999 | Edelson |
| 5,892,767 A | 4/1999 | Bell et al. |
| 5,917,156 A | 6/1999 | Nobori et al. |
| 5,973,259 A | 10/1999 | Edelson |
| 5,981,071 A | 11/1999 | Cox |
| 5,981,866 A | 11/1999 | Edelson |
| 5,994,638 A | 11/1999 | Edelson |
| 6,054,837 A | 4/2000 | Edelson |
| 6,064,137 A | 5/2000 | Cox |
| 6,084,173 A | 7/2000 | DiMatteo |
| 6,089,311 A | 7/2000 | Edelson |
| 6,117,344 A | 9/2000 | Cox et al. |
| 6,166,317 A | 12/2000 | Volk, Jr. |
| 6,175,217 B1 | 1/2001 | Da Ponte et al. |
| 6,192,687 B1 | 2/2001 | Pinkerton et al. |
| 6,214,651 B1 | 4/2001 | Cox |
| 6,225,205 B1 | 5/2001 | Kinoshita |
| 6,229,083 B1 | 5/2001 | Edelson |
| 6,232,546 B1 | 5/2001 | DiMatteo et al. |
| 6,271,614 B1 | 8/2001 | Arnold |
| 6,272,873 B1 | 8/2001 | Bass |
| 6,281,514 B1 | 8/2001 | Tavkhelidze |
| 6,314,466 B1 * | 11/2001 | Agarwal et al. ............... 709/231 |
| 6,339,785 B1 * | 1/2002 | Feigenbaum ................. 709/213 |
| 6,417,060 B2 | 7/2002 | Tavkhelidze et al. |
| 6,489,704 B1 | 12/2002 | Kucherov et al. |
| 6,493,876 B1 | 12/2002 | DeFreese et al. |
| 6,535,909 B1 * | 3/2003 | Rust ............................. 709/204 |
| 6,543,053 B1 | 4/2003 | Li et al. |
| 6,594,793 B1 * | 7/2003 | Guey ............................ 714/776 |
| 6,651,105 B1 * | 11/2003 | Bhagwat et al. ............... 709/239 |
| 6,651,760 B2 | 11/2003 | Cox et al. |
| 6,691,312 B1 | 2/2004 | Sen et al. |
| 6,711,741 B2 * | 3/2004 | Yeo ................................. 725/87 |
| 6,720,704 B1 | 4/2004 | Tavkhelidze et al. |
| 6,731,625 B1 | 5/2004 | Eastes et al. |
| 6,774,003 B2 | 8/2004 | Tavkhelidze et al. |
| 6,823,394 B2 | 11/2004 | Waldvogel et al. |
| 6,845,398 B1 * | 1/2005 | Galensky et al. ............. 709/231 |
| 6,869,855 B1 | 3/2005 | Tavkhelidze et al. |
| 6,973,667 B2 | 12/2005 | Fritsch |
| 7,107,351 B2 * | 9/2006 | Baumeister et al. .......... 709/231 |
| 7,523,482 B2 | 4/2009 | Barrett et al. |
| 7,549,160 B1 | 6/2009 | Podar et al. |
| 7,788,393 B2 | 8/2010 | Pickens et al. |
| 7,904,581 B2 | 3/2011 | Sherer et al. |
| 8,140,699 B2 | 3/2012 | Pickens et al. |
| 2001/0046749 A1 | 11/2001 | Tavkhelidze et al. |
| 2002/0114465 A1 | 8/2002 | Shen-Orr et al. |
| 2002/0124258 A1 | 9/2002 | Fritsch |
| 2002/0126755 A1 | 9/2002 | Li et al. |
| 2002/0170172 A1 | 11/2002 | Tavkhelidze et al. |
| 2003/0042819 A1 | 3/2003 | Martinovsky et al. |
| 2003/0068431 A1 | 4/2003 | Taliashvili et al. |
| 2003/0074667 A1 | 4/2003 | Cheung et al. |
| 2003/0093802 A1 | 5/2003 | Cho et al. |
| 2003/0093803 A1 | 5/2003 | Ishikawa et al. |
| 2003/0152815 A1 | 8/2003 | LaFollette et al. |
| 2004/0029341 A1 | 2/2004 | Cox et al. |
| 2004/0034712 A1 | 2/2004 | Rajwan et al. |
| 2004/0045036 A1 | 3/2004 | Terasaki |
| 2004/0195934 A1 | 10/2004 | Tanielian |
| 2005/0008240 A1 | 1/2005 | Banerji et al. |
| 2005/0081244 A1 | 4/2005 | Barrett et al. |
| 2005/0226272 A1 | 10/2005 | Luby et al. |
| 2005/0257106 A1 | 11/2005 | Luby et al. |
| 2006/0029065 A1 | 2/2006 | Fellman |
| 2006/0159117 A1 | 7/2006 | Furlong et al. |
| 2006/0187950 A1 | 8/2006 | Bou-Diab et al. |
| 2006/0200574 A1 | 9/2006 | Pickens et al. |
| 2006/0200576 A1 | 9/2006 | Pickens et al. |
| 2006/0215593 A1 | 9/2006 | Wang et al. |
| 2006/0279437 A1 | 12/2006 | Luby et al. |
| 2007/0107026 A1 | 5/2007 | Sherer et al. |
| 2007/0157221 A1 | 7/2007 | Ou et al. |
| 2008/0141097 A1 | 6/2008 | Vayanos et al. |
| 2008/0151805 A1 | 6/2008 | Vayanos et al. |
| 2008/0205640 A1 | 8/2008 | Shen-Orr et al. |
| 2009/0064242 A1 | 3/2009 | Cohen et al. |
| 2009/0100473 A1 | 4/2009 | Segel |

FOREIGN PATENT DOCUMENTS

| | | |
|---|---|---|
| EP | 1 487 215 A2 | 12/2004 |
| JP | 404080964 A | 3/1992 |
| JP | 7-322659 A | 12/1995 |

(56) References Cited

FOREIGN PATENT DOCUMENTS

| JP | 10-238406 | | 9/1998 |
|---|---|---|---|
| SU | 961916 | B | 9/1981 |
| WO | WO 97/02460 | | 1/1997 |
| WO | WO 99/10974 | | 3/1999 |
| WO | WO 99/13562 | | 3/1999 |
| WO | WO 99/40628 | | 8/1999 |
| WO | WO 02/49359 | | 6/2002 |
| WO | WO 03/021758 | A2 | 3/2003 |
| WO | WO 03/075496 | A2 | 9/2003 |
| WO | WO 03/083177 | A3 | 10/2003 |
| WO | WO 03/090245 | A1 | 10/2003 |

OTHER PUBLICATIONS

Non-Final Office Action for U.S. Appl. No. 11/360,080, 16 pages (May 26, 2009).
Non-Final Office Action for U.S. Appl. No. 11/361,303, 8 pages (Jun. 23, 2009).
International Search Report for International Application No. PCT/US2006/006446, 3 pages (Apr. 10, 2007).
Written Opinion of the International Search Authority for International Application No. PCT/US2006/006446, 3 pages (Apr. 10, 2007).
International Search Report for International Application No. PCT/US2007/061957, 3 pages (Feb. 14, 2008).
Written Opinion of the International Search Authority for International Application No. PCT/US2007/061957, 4 pages (Feb. 14, 2008).
U.S. Final Office Action dated Dec. 23, 2009 cited in U.S. Appl. No. 11/361,303, 16 pgs.
U.S. Final Office Action dated Dec. 23, 2009 cited in U.S. Appl. No. 11/360,080, 30 pgs.
U.S. Office Action dated Oct. 4, 2010 cited in U.S. Appl. No. 11/361,303, 13 pgs.
U.S. Office Action dated Mar. 29, 2011 cited in U.S. Appl. No. 11/361,303, 10 pgs.
Canadian Office Action dated Nov. 3, 2009 in Appl. No. 2,597,836, 5 pgs. (60374.0525cawo).
European Communication/Extended European Search Report dated Oct. 4, 2011 in Application No. 06735917.4, 6 pgs.
European Communication/Extended European Search Report dated Nov. 22, 2012 cited in Appl. No. 07 756 849.1, 9 pgs.
Canadian Office Action dated Nov. 26, 2012 in Appl. No. 2,597,836, 2 pgs.
Fitzpatrick, Gary et al., "Demonstration of Close-Spaced Thermionic Converters," Proceedings of the 28th Intersociety Energy Conversion Engineering Conference, May 1993, pp. 1.573-1.580, vol. 1, American Chemical Society, Washington, DC, USA.
Fitzpatrick, Gary O. et al., "Close-Spaced Thermionic Converters with Active Spacing Control and Heat-Pipe Isothermal Emitters," Proceedings of the $31^{st}$ Intersociety Energy Conversion Engineering Conference, Aug. 11, 1996, pp. 920-927, vol. 2, IEEE, USA.
Fitzpatrick, Gary O. et al., "Updated perspective on the potential for thermionic conversion to meet $21^{st}$ century energy needs," IECEC '97, Proceedings of the $32^{nd}$ Intersociety Energy Conversion Engineering Conference, Energy Systems, Renewable Energy Resources, Environmental Impact and Policy Impacts on Energy, Jul. 27, 1997, pp. 1045-1051, vol. 2, IEEE, USA.
Fukuda, Ryuzo et al., "Development of the Oxygenated Thermionic Energy Converters Utilizing the Sputtered Metal Oxides as a Collector," Space Technology and Applications International Forum, 1999, AIP Conference Proceedings, Subseries: Astronomy and Astrophysics, Jan. 22, 1999, pp. 1444-1451, vol. 458, American Institute of Physics, USA.
Hatsopoulos, George N. et al., "Thermionic Energy Conversion—vol. 1: Process and Devices," Mar. 15, 1974, p. 222, The MIT Press, USA.
Houston, J.M., "Theoretical Efficiency of the Thermionic Energy Converter," Journal of Applied Physics, Sep. 17, 1959, pp. 481-487, vol. 30, No. 4, American Institute of Physics, New York.
Huffman, Fred N. et al., "Preliminary Investigation of a Thermotunnel Converter," 1988 IECEC; Proceedings of the $23^{rd}$ Intersociety Energy Conversion Engineering Conference, Aug. 1988, pp. 573-579, vol. 1, American Society of Mechanical Engineers, New York.
Kalandarishvili, Arnold G., "The basics of the technology of creating a small interelectrode spacing in thermionic energy converters with the use of two-phase systems," IECEC '97, Proceedings of the $32^{nd}$ Intersociety Energy Conversion Engineering Conference, Energy Systems, Renewable Energy Resources, Environmental Impact and Policy Impacts on Energy, Jul. 27, 1997, pp. 1052-1056, vol. 2, IEEE, USA.
King, Donald B. et al., "Results from the Microminiature Thermionic Converter Demonstration Testing Program," Space Technology and Applications International Forum—1999, Jan 22, 1999, pp. 1432-1436, vol. 458, American Institute of Physics, USA.
Mahan, G.D., "Thermionic Refrigeration," Journal of Applied Physics, Oct. 1, 1994, pp. 4362-4366, vol. 76, Issue, 7, American Institute of Physics, USA.
Shakouri Ali et al., "Enhanced Thermionic Emission Cooling in High Barrier Superlattice Hetero-structures," Materials Research Society Symposium Proceedings, Mar. 1999, pp. 449-458, vol. 545, Materials Research Society, Warrendale, Pennsylvania.
Svennson, Robert et al., "TEC as Electric Generator in an Automobile Catalytic Converter," Proceedings of the $31^{st}$ Intersociety Energy Conversion Engineering Conference, Aug. 1996, pp. 941-944, vol. 2, IEEE, USA.
Zeng, Taofang et al., "Hot Electron Effects on Thermionic Emission Cooling in Heterostructures," Materials Research Society Symposium Proceedings, Mar. 1999, pp. 467-472, vol. 545, Materials Research Society, Warrendale, Pennsylvania.

\* cited by examiner

METHOD AND SYSTEM FOR STREAMING DIGITAL VIDEO CONTENT TO A CLIENT IN A DIGITAL VIDEO NETWORK

CROSS-REFERENCE TO RELATED APPLICATIONS

This application is entitled to the benefit of provisional U.S. Patent Application Ser. No. 60/772,061, filed Feb. 10, 2006, the disclosure of which is incorporated by reference herein in its entirety.

This application is a continuation in part of the U.S. patent application entitled "FAST CHANNEL CHANGE WITH CONDITIONAL RETURN TO MULTICASTING" having application Ser. No. 11/360,078, filed Feb. 23, 2006, the U.S. patent application entitled "SWITCHING A CLIENT FROM UNICASTING TO MULTICASTING BY INCREASING THE UNICAST STREAM RATE TO THE CLIENT" having application Ser. No. 11/360,080, filed Feb. 23, 2006, and the U.S. patent application entitled "SWITCHING A CLIENT FROM UNICASTING TO MULTICASTING BY SIMULTANEOUSLY PROVIDING UNICAST AND MULTICAST STREAMS TO THE CLIENT" having application Ser. No. 11/361,303, filed Feb. 23, 2006.

FIELD OF THE INVENTION

The invention relates generally to digital video networks, and more particularly, to techniques for streaming digital video content to a client in a digital video network that is capable of distributing digital video content via multicasting and unicasting.

BACKGROUND OF THE INVENTION

The viewer experience with delivery of digital video content via broadcast channels is often poor. Because of the characteristics of compressed video encoding, the viewer often waits seconds after selection of a broadcast channel until the digital video content is finally displayed. Because viewers are accustomed to near instantaneous channel change functionality with analog television, the quality of the digital television experience often times does not meet viewer expectations.

One cause of the slow channel change problem involves the framing of compressed video (e.g., MPEG2 or MPEG4/H.264). In order to minimize bandwidth, the majority of the frames contained within a compressed stream of digital video content are P-frames and B-frames, which are frames that encode changes to a displayed image. An I-frame (MPEG2) on the other hand is a frame that presents a complete new image. The rate at which I-frames (or equivalent I-slice constructs in MPEG4) are delivered in a digital video stream is typically one I-frame every ¼ to 2 seconds, depending on the amount of motion contained within the stream. The delay after requesting a channel change is dominated by having to wait until the next I-frame finally arrives, which can be up to 2 seconds, before the new channel can be displayed.

In an Internet Protocol (IP) television environment, different channels of digital video content are distributed to multiple clients via IP multicasting. One technique for implementing a fast channel change in an IP television environment is described in U.S. Pat. Publ. No. 2005/0081244 to Barret et al. The technique described by Barret et al. involves servicing a channel change request by 1) retaining an I-frame from each different broadcast stream, and then 2) transmitting the retained I-frame for the requested channel to the corresponding client via a unicast message instead of via a multicast message. The I-frame is then used to quickly display the requested channel. Once the retained I-frame is sent to the client via the unicast message, the client is rapidly joined to the multicast group corresponding to the requested channel in time for the client to receive the next I-frame via multicasting. In IP television environments, internet group management protocol (IGMP) is typically used to join clients to multicast groups. While transmitting an I-frame via a unicast message works well to achieve a fast channel change, using IGMP to join a client to a multicast group requires multiple messages between client and server. When a large number of channel change requests are made in a short period of time, the flood of associated IGMP messages can introduce significant delay into the network. In particular, delay associated with the IGMP messages can place limitations on the scalability of this fast channel technique.

In addition to a channel change being fast, it is important to the viewer experience that the quality of the post-channel change content be comparable to the quality of the pre-channel change content. Real-time Transport Protocol (RTP) is a packet-based protocol that is widely used to stream video media. RTP Control Protocol (RTCP) is a control protocol for use with RTP. Upon receiving a new stream of digital video content, typical RTP/RTCP schemes require the receiving client to wait for a client buffer to grow large enough to sustain negative acknowledgements before digital video content from the new stream can be played out at the client. The wait time can be reduced by sending an initial burst of digital video content to the client to rapidly fill the buffer. Although it is possible to transmit a large initial burst of digital video content to rapidly fill a client buffer, this approach does not scale well in a multiclient digital video network.

In view of this, what is needed is a technique for streaming digital video content to a client, including providing fast channel changes, which is able to provide new streams of digital video content to a client with minimal delay at an acceptable quality level and which scales well when applied in a multi-client network.

SUMMARY OF THE INVENTION

A technique for streaming digital video content to a client involves providing a new stream of digital video content to the client using forward error correction (FEC) for a limited initial period and then ending the use of FEC after the limited initial period has ended. In an embodiment, during the limited initial period, the digital video content is provided to the client at a rate that is slightly higher than the playout rate, e.g., 1-10% higher than the playout rate, in order to allow a client buffer to accumulate digital video content. FEC continues to be used until the client buffer is sufficiently populated such that lost or damaged frames can be retransmitted to the client before the corresponding digital video content is needed for playout. Once the client buffer is sufficiently populated, FEC is ended and retransmission is used to maintain the quality of the streamed digital video content. Using FEC for the limited initial period provides error protection immediately upon receiving a new stream of digital video content without imposing long term processing and bandwidth drains on the network. The use of FEC for the limited initial period enables the client to immediately begin decoding and displaying new digital video content while allowing time for the client buffer to be filled without having to send a large burst of frames to the client. Additionally, using retransmission after the limited initial period to provide long term error protection reduces the demands on processing and bandwidth resources.

In an embodiment, the technique is applied to servicing a channel change request in a streaming digital video network. In this application, the technique involves using FEC for a limited initial period after detecting a channel change request. FEC helps to maintain the quality of digital video content for the requested channel immediately upon executing the channel change and thereby supports a high-quality fast channel change. FEC continues to be used until a buffer at the client is sufficiently populated such that lost or damaged frames can be retransmitted to the client before the corresponding digital video content is needed for playout. While FEC is used, the client buffer is populated by a relatively small increase in the stream rate over the playout rate and without a large burst of frames. Once the client buffer is adequately populated, FEC is ended and retransmission is used to maintain the quality of the streamed digital video content.

Other aspects and advantages of the present invention will become apparent from the following detailed description, taken in conjunction with the accompanying drawings, illustrating by way of example the principles of the invention.

BRIEF DESCRIPTION OF THE DRAWINGS

Throughout the description, similar reference numbers may be used to identify similar elements.

DETAILED DESCRIPTION OF THE INVENTION

As used herein, the terms "multicast" and "multicasting" refer to a technique for providing the same digital video content to multiple clients in which the digital video content is delivered over common links only once (e.g., the digital video content is copied when it reaches nodes with links to multiple destinations). As used herein, multicast and multicasting are synonymous with the terms broadcast and broadcasting as related to, for example, hybrid fiber coaxial (HFC) cable networks.

As used herein, the terms "unicast" and "unicasting" refer to a technique for providing digital video content to a single specified client.

In some applications, the network for distributing digital video content is a packet-based network. In packet-based networks, multicasting may involve replicating packets at nodes that include multiple branches leading to different clients. The replication of packets at branching nodes eliminates the need to send multiple packets of the same content over the same link. Packet-based distribution networks may utilize, for example, IP, Ethernet, ATM, or a combination thereof to communicate digital video content. In packet-based networks, unicasting typically involves point-to-point messaging between nodes (e.g., servers and clients). Point-to-point messaging can be accomplished, for example, using well-known source/destination address based protocols (e.g., IP or Ethernet).

In some applications, the network for distributing digital video content includes an HFC network that utilizes radio frequency signals (RF) for local distribution of digital video content to the clients. In HFC networks, multicasting typically involves distributing all channels to all clients. Each client is able to receive any channel by tuning to the desired channel. In HFC networks, unicasting may involve distributing a channel, which is intended for only one client, to multiple clients and coordinating with the intended client so that only the intended client is able to receive to the desired channel. Even though the channel may be distributed to multiple clients, only one client, the intended client, is able to access the channel and display the digital video content. For purposes of this description, a communications technique such as this, which can be implemented in HFC networks, is considered unicasting.

Figure 1A:
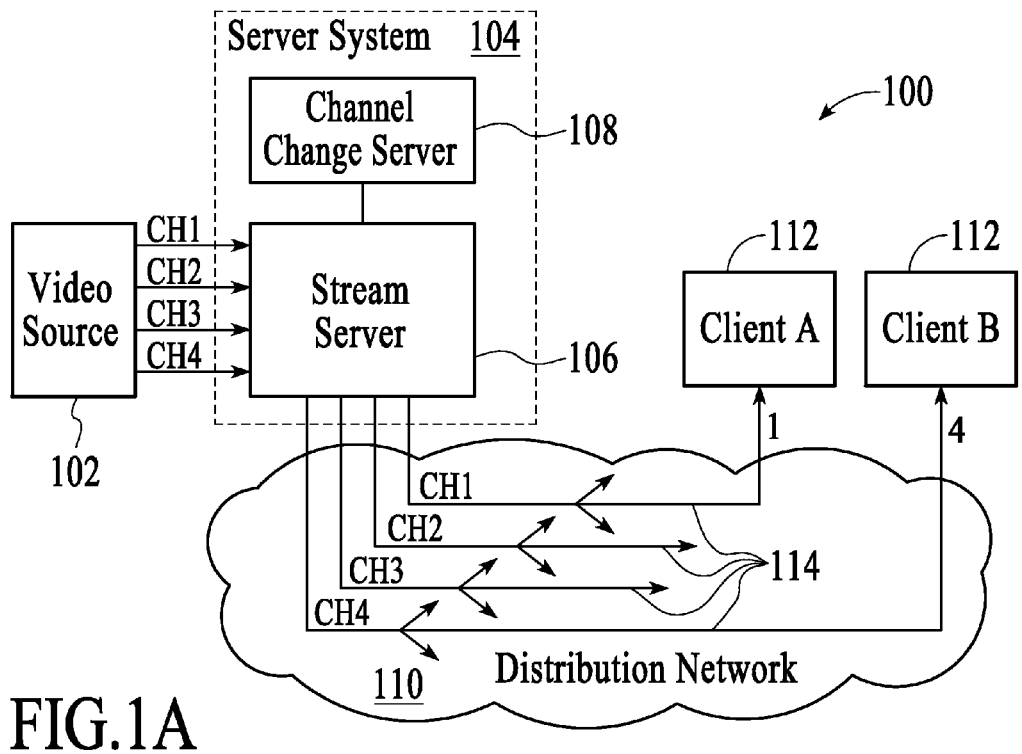
FIGS. 1A-1F illustrate a technique for servicing channel change requests in accordance with an embodiment of the invention.

FIGS. 1A-1F illustrate a technique for servicing channel change requests in accordance with an embodiment of the invention. Referring to FIG. 1A, the digital video network 100 includes a video source 102, a server system 104 having a stream server 106 and a channel change server 108, a distribution network 110, and clients 112. The video source provides multiple channels of digital video content to the stream server. The stream server ingests the digital video content from the video source and controls the distribution of the digital video content into the distribution network. The channel change server manages channel change requests that are received from the clients. The channel change server is described in more detail below.

The distribution network 110 supports the multicasting and unicasting of digital video content downstream to the clients 112. The distribution network also supports upstream unicast messaging from the clients to the stream server 106 and channel change server 108. The distribution network may utilize any network technology that supports multicasting and unicasting. In a packet-based environment, the distribution network may utilize, for example, routers, switches, DSLAMs, cable modem termination systems (CMTSs), passive optical network (PON) architectures, or any combination thereof. In an HFC environment, the distribution network may utilize, for example, a combination of routers, switches, and QAMs. The clients are systems that receive the digital video content from the distribution network and provide the digital video content to video display devices (e.g., televisions). The clients may be embodied as hardware, firmware, software, or any combination thereof and are sometimes referred to as set-top boxes (STBs). Clients in general are well-known in the field. Specific functions of the clients in accordance with the invention are described in more detail below.

Referring to FIG. 1A, multiple channels of digital video content are provided to the stream server 106. For example purposes, channels 1, 2, 3, and 4 are provided to the stream server although it should be understood that more channels could be provided. In this embodiment, the digital video content is real-time digital video content that is received at the video source 102 and passed to the stream server with little or no delay. For example, the digital video content includes real-time content from the content producers and/or distributors. The digital video content may include, for example, live content (e.g., live sporting events, news, etc.) or pre-recorded content that is released by the content producers and/or distributors. In other embodiments, the digital video content may be stored locally by the stream server, by a dedicated storage server, or within the distribution network 110. Whether the digital video content is real-time or stored locally, the digital video content is delivered to the stream server for distribution to the clients 112. The stream server supports the multicasting of the channels to any client that desires to receive the digital video content. As illustrated by the branching distribution arrows in FIG. 1A, all four channels can be distributed via multicasting 114 within the distribution network to reach multiple clients.

In the example of FIG. 1A, client A receives channel 1 via multicasting and client B receives channel 4 via multicasting. Although not shown, these channels can be received by multiple clients simultaneously via multicasting. Note, in an HFC network that utilizes RF for local distribution of digital video content to the clients, multiple channels may be provided simultaneously to multiple clients via the RF signals although only the desired channel is received and demodulated by the client.

Figure 1B:
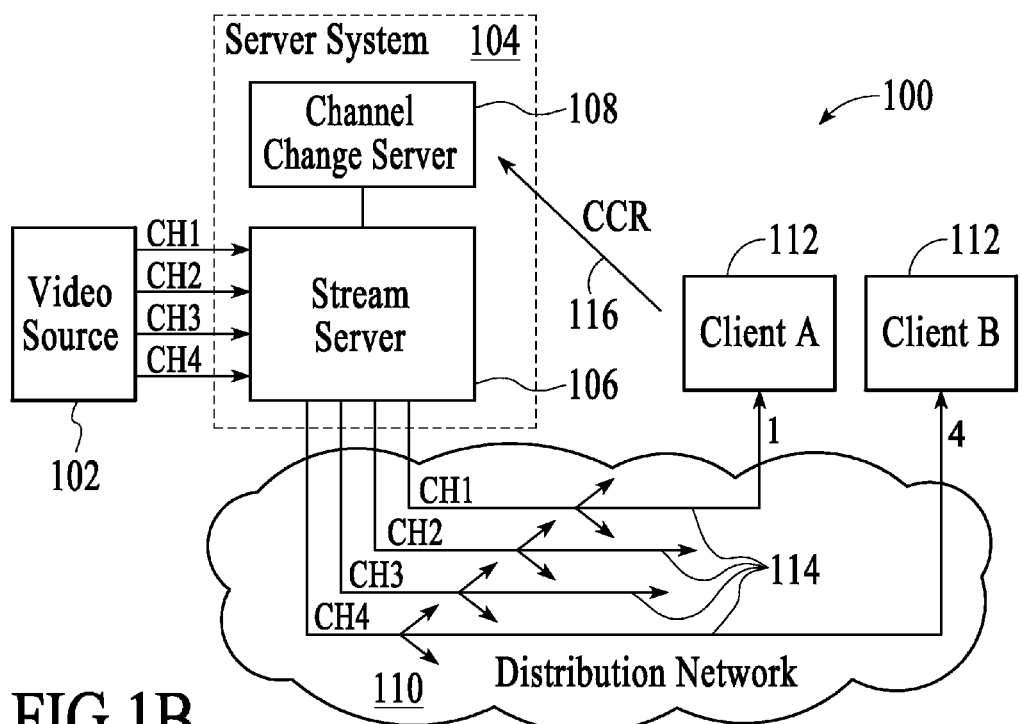
Figure 1C:
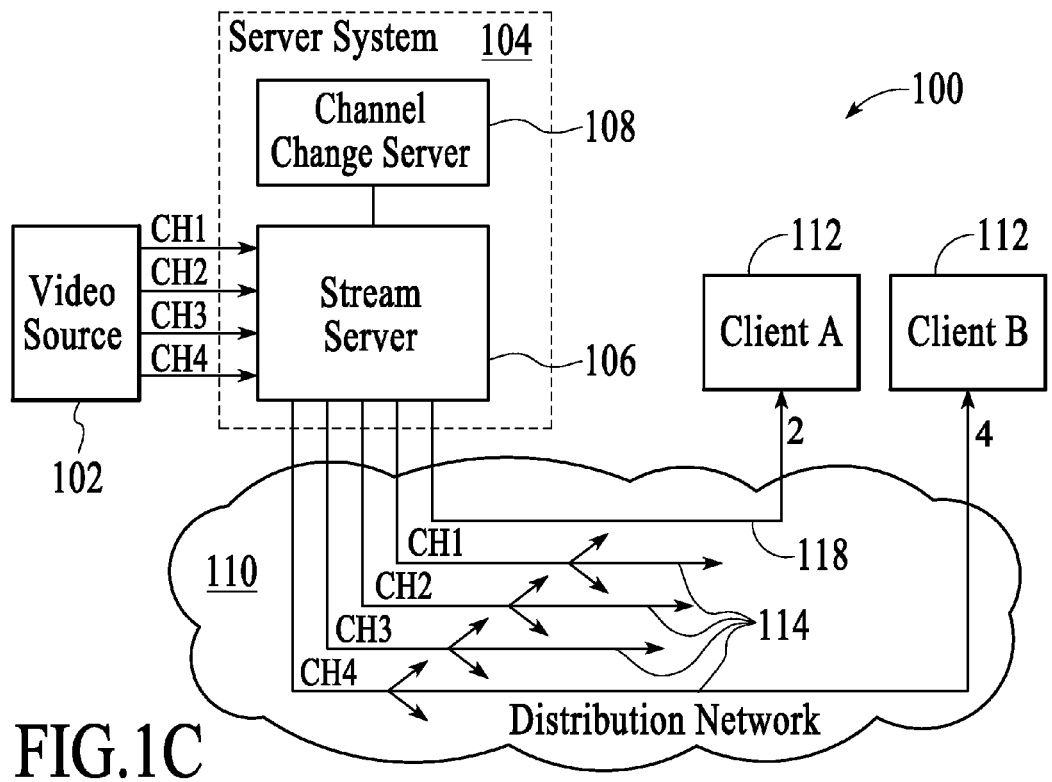

Referring to FIG. 1B, a channel change request (CCR) 116 is made by client A to change from channel 1 to channel 2. In an embodiment, the channel change request is provided to the channel change server 108 via a unicast message from the client 112 to the channel change server. The channel change request is serviced by providing the digital video content related to the requested channel to the client via unicasting. That is, digital video content related to the requested channel is provided to the client via unicasting instead of via multicasting. FIG. 1C depicts channel 2 being provided to client A via unicasting 118 instead of multicasting 114. In an embodiment, to achieve a fast change from channel 1 to channel 2 using unicasting instead of multicasting, a unicast session is established between the server system 106 and the client and the stream server starts unicasting channel 2 with an I-frame. A technique for starting a unicast with an I-frame is described in more detail below.

In accordance with the invention and in contrast to the prior art, the digital video content related to channel 2 continues to be provided to the client 112 via unicasting until a pre-established condition is met. That is, multiple consecutive frames of digital video content related to channel 2 are unicast to the client and the client is not switched back to receiving digital video content via multicasting until some pre-established condition is satisfied. In particular, the client is not switched back to multicasting after the unicasting of a single I-frame as is known in the prior art. By not immediately switching back to multicasting after unicasting the single I-frame, the network is allowed to opportunistically switch the client from unicasting back to multicasting. By opportunistically switching the client from unicasting back to multicasting, network resources can be intelligently managed to achieve efficient resource utilization.

In accordance with the invention, exemplary pre-established conditions which could trigger a switch from unicasting back to multicasting include:

1) Expiration of a pre-established time interval;

2) Expiration of a pre-established time interval in which no channel change requests are received;

3) An explicit request to join multicasting (e.g., a request to switch back to multicasting or a request to exit a surf mode);

4) Reaching a pre-established resource threshold (e.g., switch back to multicasting only when certain resources are available);

5) Reaching a benefit threshold (e.g., switch back to multicasting only if a certain benefit is achieved or only if certain resources can be reclaimed).

Figure 1D:
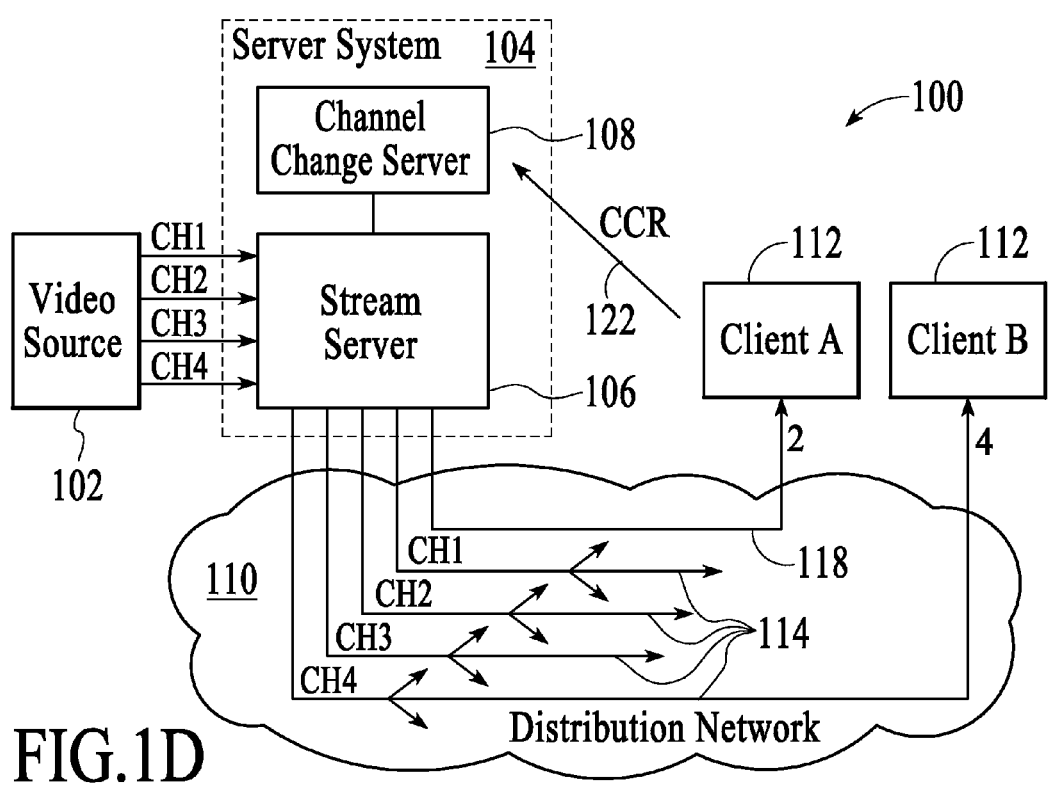
Figure 1E:
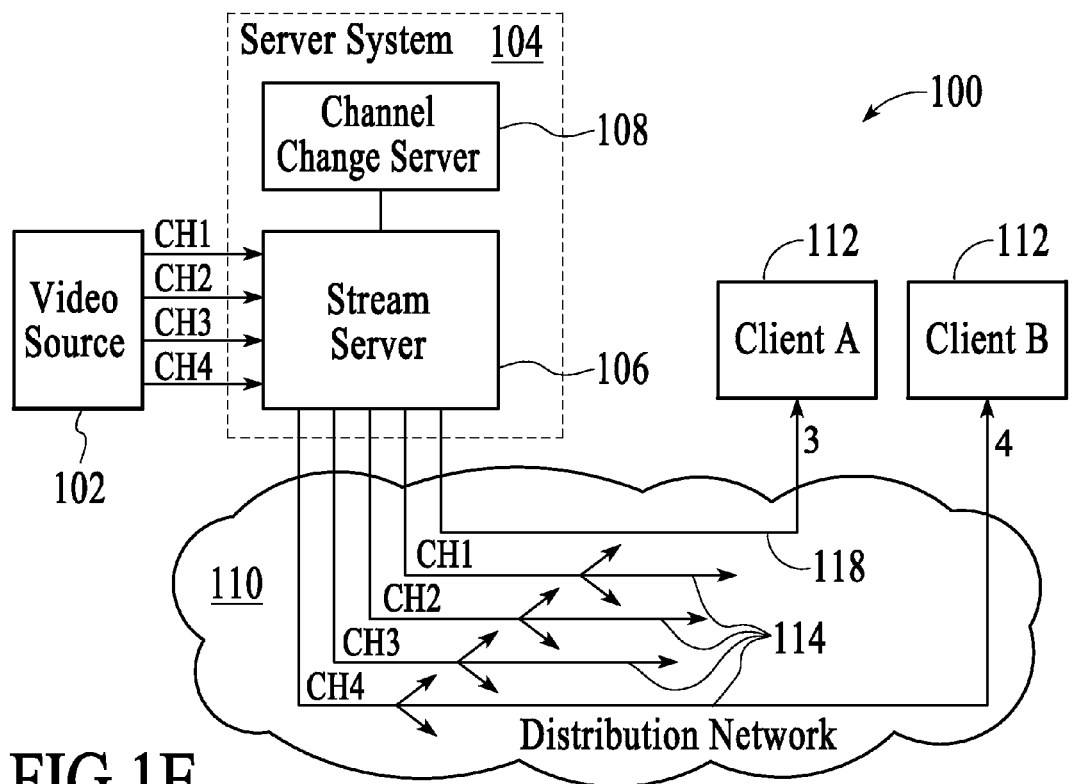

Before the client 112 is switched back to multicasting, if any additional channel change requests are made by the client (e.g., client A), the channel change requests are serviced via unicasting instead of multicasting. FIG. 1D depicts a channel change request 122 that is generated by client A before the client is switched from unicasting back to multicasting. In this case, client A is requesting a change to channel 3. In response to the channel change request, the digital video content related to channel 3 is provided to the client via unicasting instead of multicasting. FIG. 1E depicts channel 3 being provided to client A via unicasting instead of multicasting. The channel change requests can be serviced via unicasting by splicing the requested channel into the unicast session that was used to provide the previous channel. In an embodiment, the stream server indicates channel change boundaries between unicast streams by, for example, using a marker bit or an explicit signal at the first I-frame of a new unicast stream. Further, once the client detects the start of the new unicast stream, the client resets its decoder and flushes from its buffer undecoded frames related to the previous unicast stream.

Figure 1F:
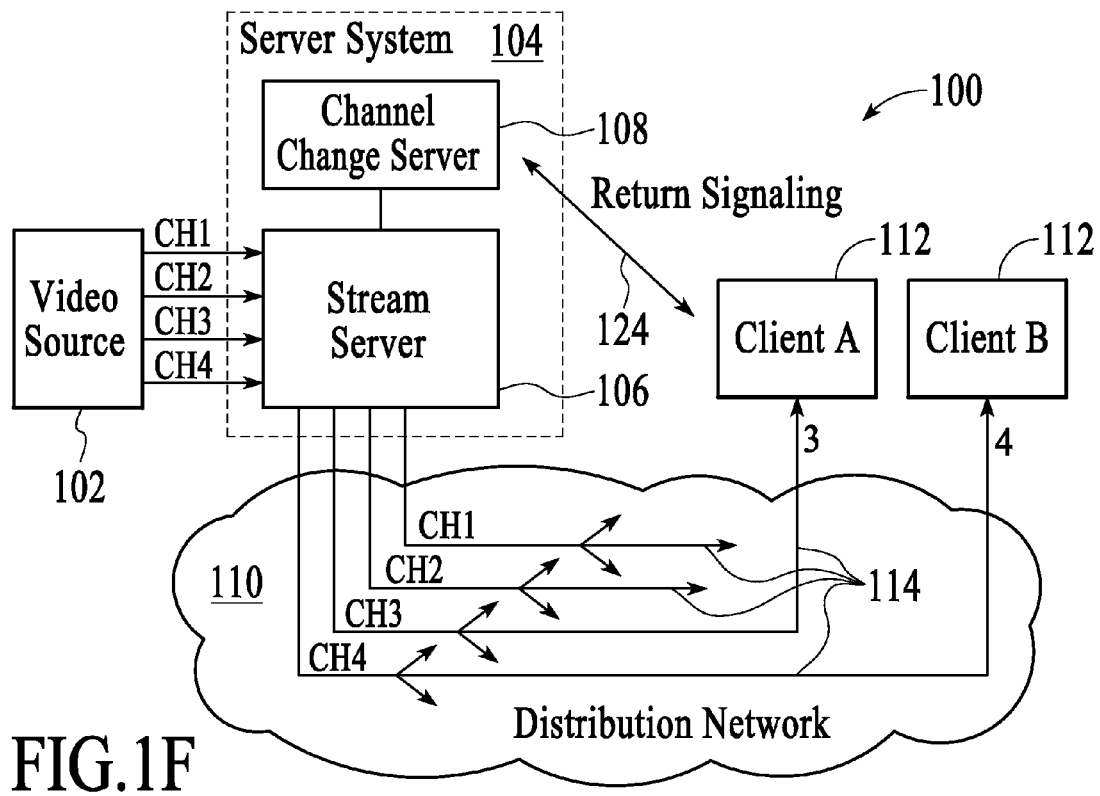

Once the pre-established condition is met, the process of switching back to providing digital video content to the client 112 via multicasting instead of unicasting is initiated. FIG. 1F depicts communications 124 between the channel change server 108 and client A that support the switching of client A from unicasting back to multicasting. FIG. 1F also depicts channel 3 being provided to client A via multicasting instead of unicasting after the switch has been completed. Note that in FIG. 1F the unicast session between the server system 104 and client A has been terminated.

Figure 2:
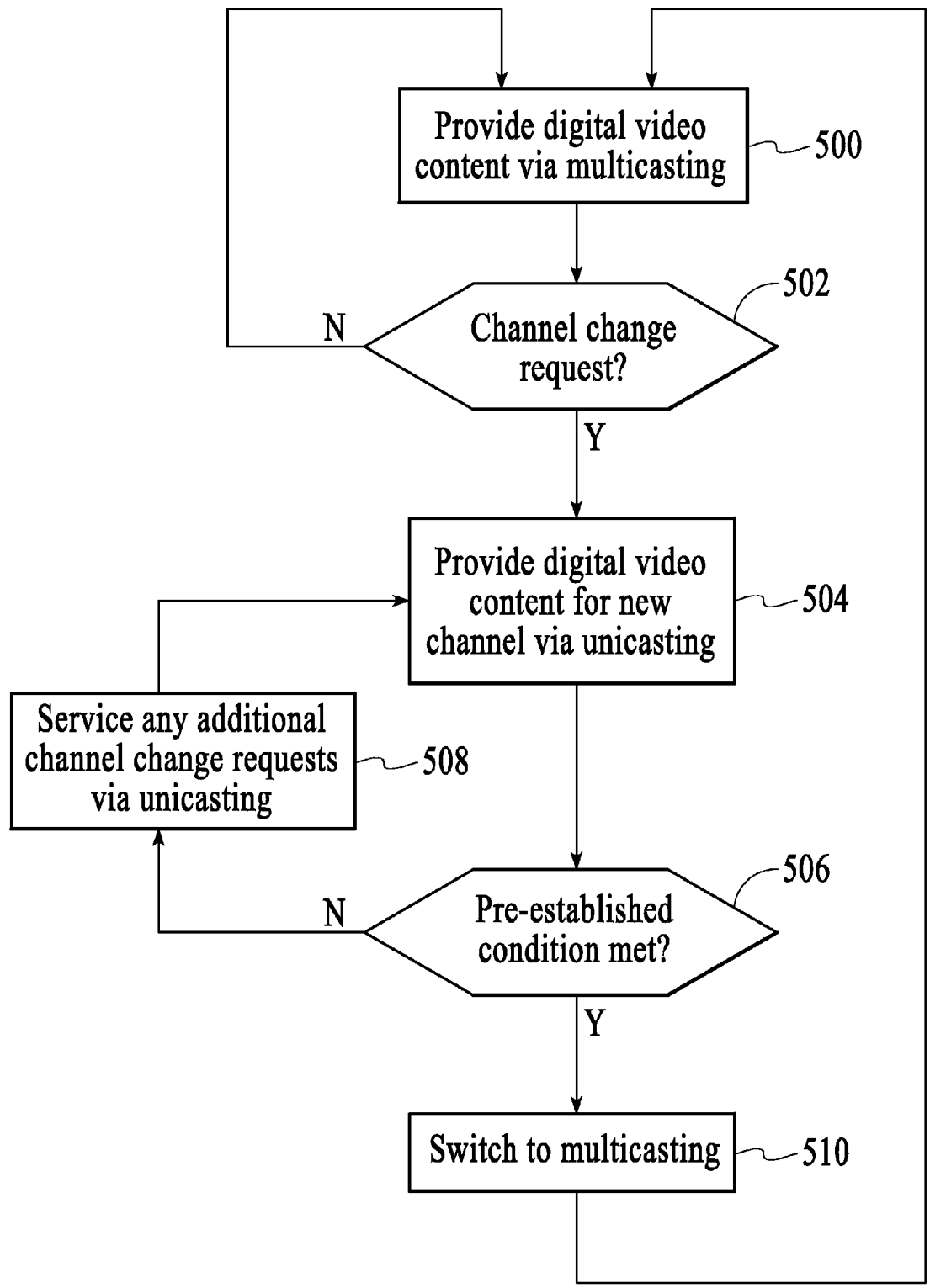
FIG. 2 depicts a process flow diagram of the above-described technique for servicing channel change requests in a digital video network that is capable of distributing digital video content to clients via multicasting and unicasting.

FIG. 2 depicts a process flow diagram of the above-described method for servicing channel change requests in a digital video network that is capable of distributing digital video content to clients via multicasting and unicasting. At block 500, digital video content is provided to a client via multicasting. At decision point 502, it is determined if there has been a channel change request. If there is no channel change request, then the digital video content continues to be provided to the client via multicasting. If there is a channel change request, then digital video content for the new channel is provided to the client via unicasting instead of multicasting (block 504). In an embodiment, unicasting of the new channel involves starting the unicast with the first buffered I-frame and continuing to unicast multiple consecutive frames of the digital video content related to the requested channel. In accordance with an embodiment of the invention, digital video content continues to be provided to the client via unicasting until a pre-established condition is met. As long as the pre-established condition has not been met (the "N" branch at decision point 506), digital video content continues to be provided via unicasting (block 504) and any additional channel change requests are serviced via unicasting (block 508). Once the pre-established condition is met (the "Y" branch at decision point 506), a switch is made from unicasting back to multicasting (block 510). Some techniques for making a smooth transition from unicasting to multicasting are described below. After the switch is complete, digital video content is once again provided to the client via multicasting (block 500).

FIG. 2 can be viewed from the perspective of the server system 104 (e.g., the stream server 106 and/or the channel change server 108). Alternatively, FIG. 2 can be viewed from the perspective of the client 112 by modifying block 500 to read 'receive' digital video content via multicasting instead of 'provide' digital video content via multicasting and by modifying block 504 to read 'receive' digital video content for new channel via unicasting instead of 'provide' digital video content for new channel via unicasting.

Figure 3:
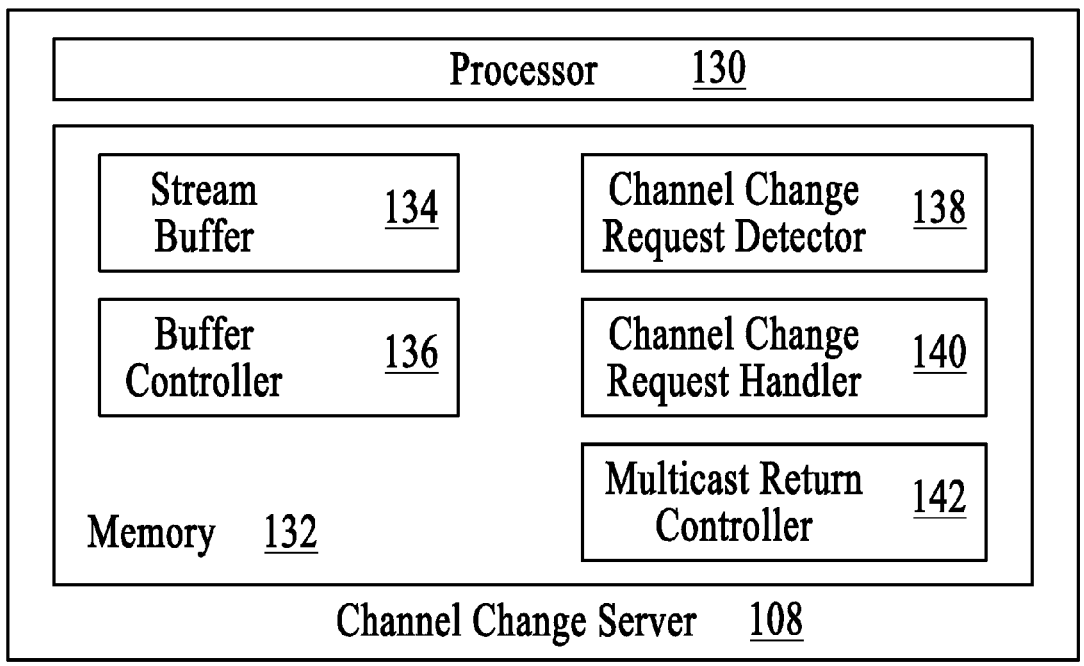
FIGS. 3 and 4 depict an embodiment of a channel change server and a client, respectively, which are configured to service channel change requests in accordance with an embodiment of the invention.
Figure 4:
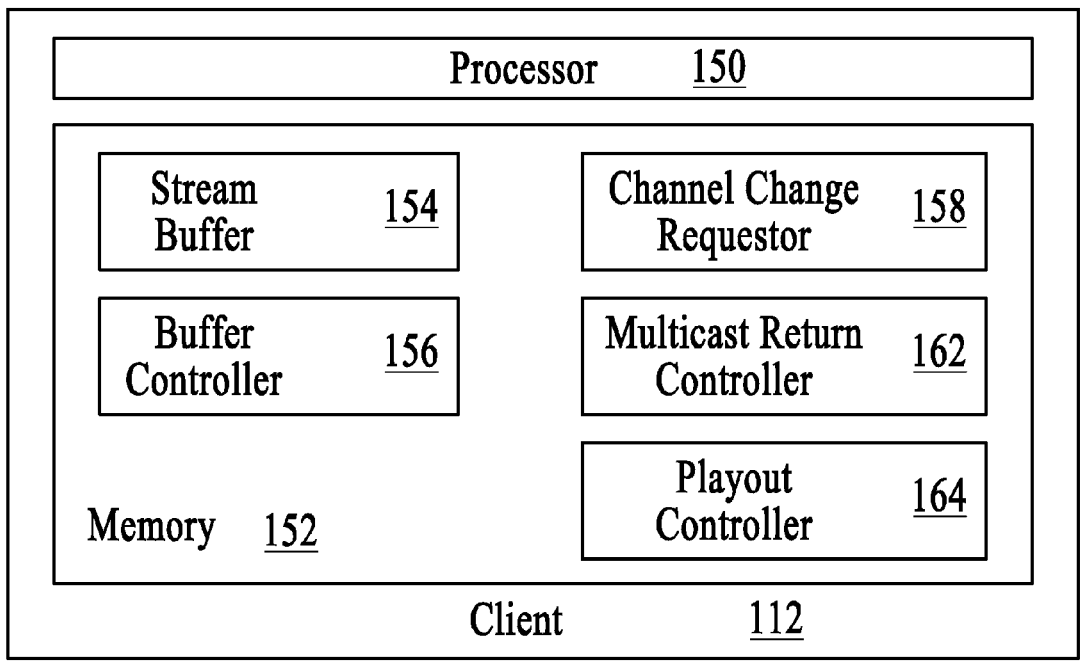

FIGS. 3 and 4 depict an embodiment of a channel change server 108 and a client 112, respectively, which are configured to service channel change requests as described above. With reference to FIG. 3, the channel change server includes a processor 130 and memory 132. The memory includes a stream buffer 134, a buffer controller 136, a channel change request detector 138, a channel change request handler 140, and a multicast return controller 142. The buffer controller manages the buffering of digital video content that is streamed into the stream server. The buffered streams are held in the stream buffer for a limited period of time. In an embodiment, approximately one-half to two seconds from each stream is continuously buffered in the stream buffer. The channel change request detector detects channel change requests that are generated by the clients. In an embodiment, channel change requests are unicast messages that are addressed to the channel change server or forwarded to the channel change server through an intermediate server. The channel change request handler manages the switch from multicasting to unicasting that occurs in response to a channel change request. The multicast return controller manages the switch from unicasting back to multicasting once the pre-established condition is met. In an embodiment, the multicast return controller actively monitors the pre-established condition and in other embodiments, the multicast return controller receives a signal indicating that the pre-established condition has been met.

With reference to FIG. 4, the client 112 includes a processor 150 and memory 152. The memory includes a stream buffer 154, a buffer controller 156, a channel change requester 158, a multicast return controller 162, and a playout controller 164. The buffer controller manages the buffering of an incoming stream (or streams if the client is able to simultaneously ingest multiple streams) into the stream buffer. The channel change requestor generates the channel change requests that are provided to the channel change server 108. In an embodiment, the channel change requester generates a unicast message, which is addressed directly to the channel change server, as the channel change request. The multicast return controller of the client manages the switch from unicasting back to multicasting and the playout controller controls the playout of digital video content from the stream buffer.

Figure 5:
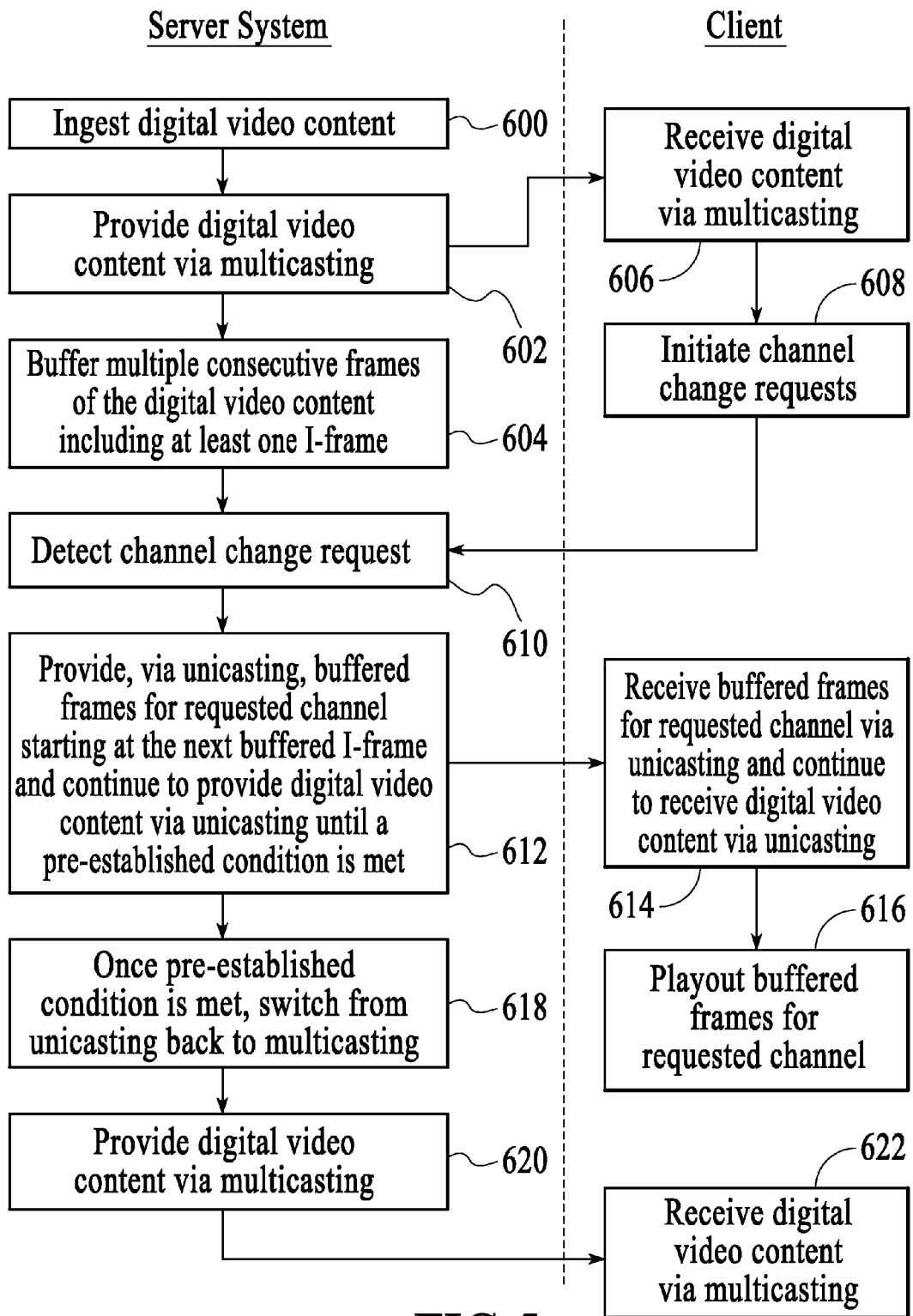
FIG. 5 depicts an exemplary process flow diagram that illustrates the interaction between a server system and a client related to servicing a channel change request.

In an embodiment, channel change requests are serviced through interaction between the server system 104 and the client 112. FIG. 5 depicts an exemplary process flow diagram that illustrates the interaction between the server system (i.e., the channel change server 108 and/or the stream server 106) and a client 112 related to servicing a channel change request. At block 600, digital video content is ingested, for example, at the stream server. In an embodiment, real-time digital video content for multiple channels is received at the stream server and portions of each channel are buffered by the channel change server for use in servicing channel change requests. At block 602, digital video content is provided to the client via multicasting. At block 604, multiple consecutive frames of digital video content, including at least one I-frame are buffered. At block 606, the client receives the digital video content via multicasting. At block 608, a channel change request is initiated by the client and at block 610 the channel change request is detected by the channel change server. In response to the channel change request, at block 612, buffered frames for the requested channel are provided to the client via unicasting. In an embodiment, the buffered frames are provided starting at the first buffered I-frame and the digital video content continues to be provided to the client via unicasting until a pre-established condition is met. At block 614, the client receives the buffered frames via unicasting and at block 616 the buffered frames for the requested channel are played out. Once the pre-established condition is met, a switch is made from unicasting back to multicasting (block 618). Upon switching from unicasting back to multicasting, digital video content is again provided to the client via multicasting (block 620). At block 622, the client receives the digital video content via multicasting instead of unicasting.

Figure 6:
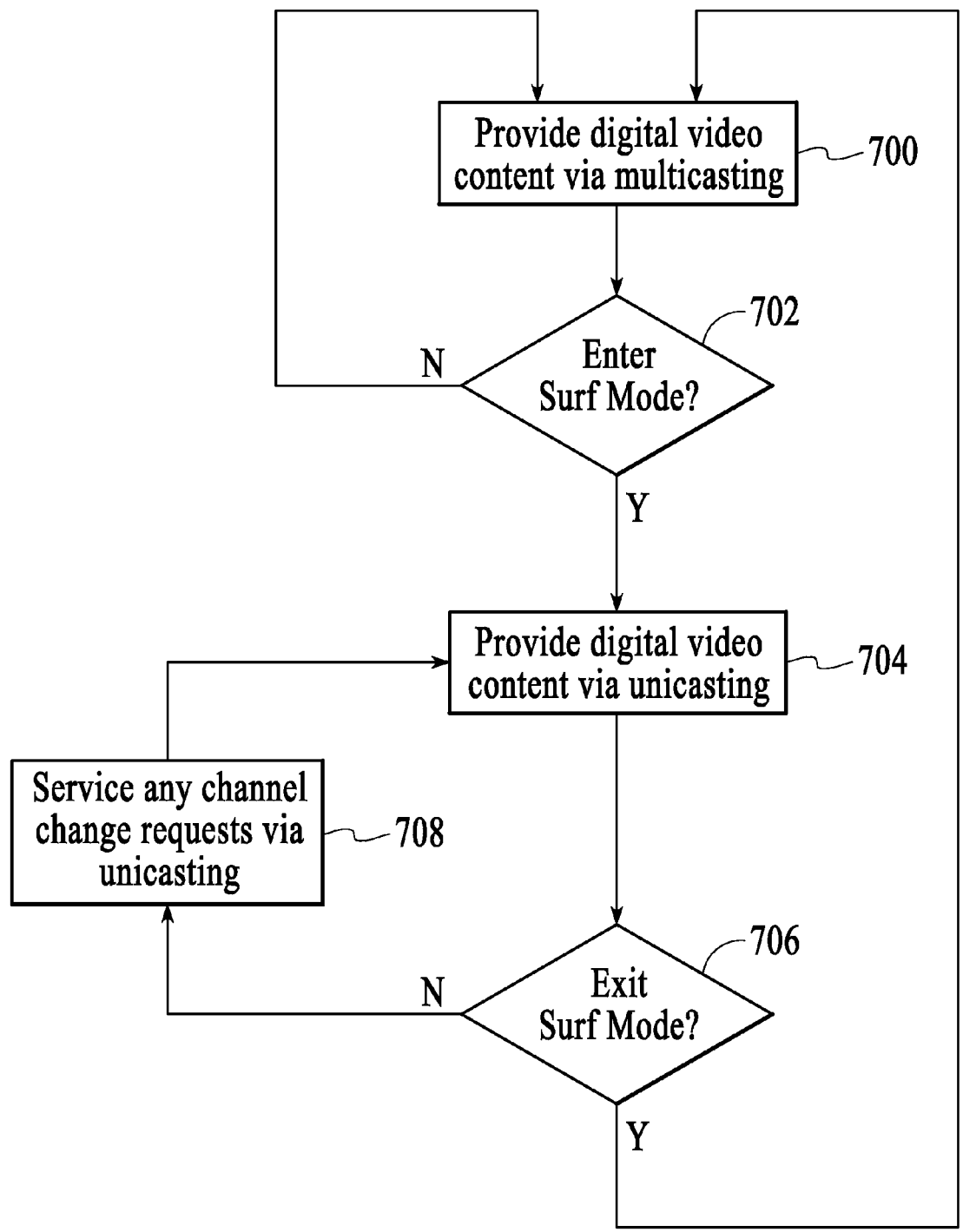
FIG. 6 is an exemplary process flow diagram of surf mode logic in accordance with an embodiment of the invention.

In an alternative embodiment of the invention, whether the digital video content is provided via multicasting or unicasting is a function of whether or not the client is in "surf mode." When the client is not in surf mode, digital video content is provided to the client via multicasting and when the client is in surf mode, digital video content is provided to the client via unicasting. FIG. 6 is an exemplary process flow diagram of the surf mode logic. In this example, the client is initially not in surf mode and at block 700, digital video content is provided to the client via multicasting. As indicated by the "N" branch at decision point 702, as long as the client is not in surf mode, digital video content continues to be provided via multicasting. Once the client enters surf mode (the "Y" branch at decision point 702), digital video content is provided to the client via unicasting (block 704). As long as the client stays in surf mode (the "N" branch at decision point 706), digital video content continues to be provided to the client via unicasting and any channel change requests are serviced via unicasting (block 708). Once the client exits surf mode (the "Y" branch at decision point 706), digital video content is provided to the client via multicasting instead of unicasting. Surf mode can be entered in response to, for example, a channel change request or an explicit command to enter surf mode. Surf mode can be exited in response to, for example, the expiration of a pre-established time period, the expiration of a pre-established time period in which no channel change requests are generated by the client, an explicit exit command, or some other condition such as one of the pre-established conditions identified above. The surf mode status of a client can be, for example, indicated by a state machine or held in memory at the client, the channel change server, the stream server, or any combination thereof.

FIG. 6 can be viewed from the perspective of the server system 104 (e.g., the stream server 106 and/or the channel change server 108). Alternatively, FIG. 6 can be viewed from the perspective of the client 112 by modifying block 700 to read 'receive' digital video content via multicasting instead of 'provide' digital video content via multicasting and by modifying block 704 to read 'receive' digital video content via unicasting instead of 'provide' digital video content via unicasting.

Figure 7A:
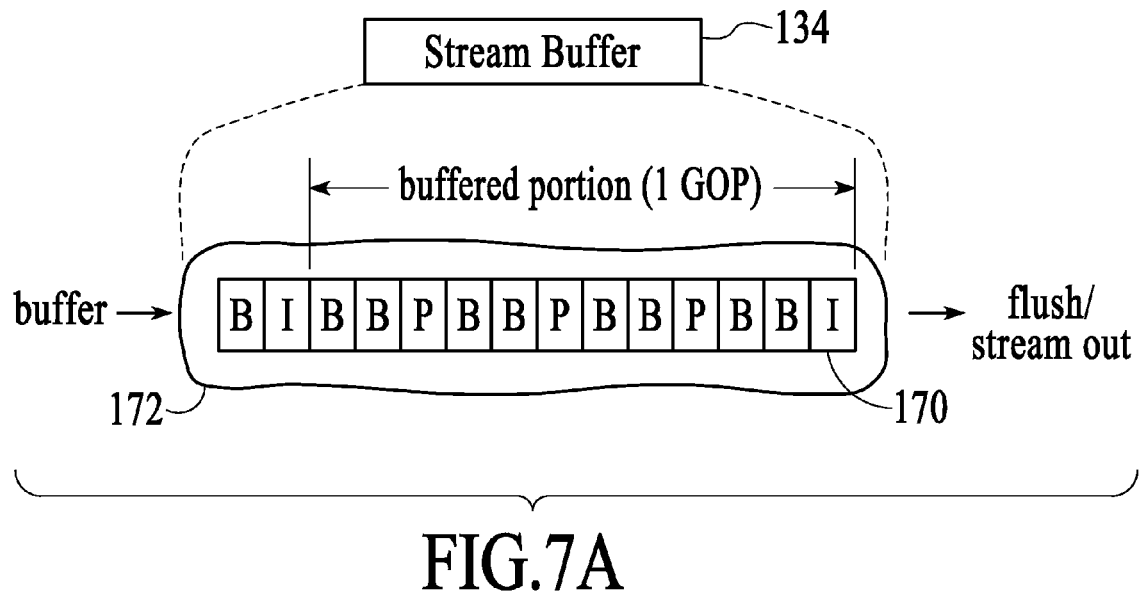
FIGS. 7A-7C depict a process of servicing a channel change request via unicasting.
Figure 7B:
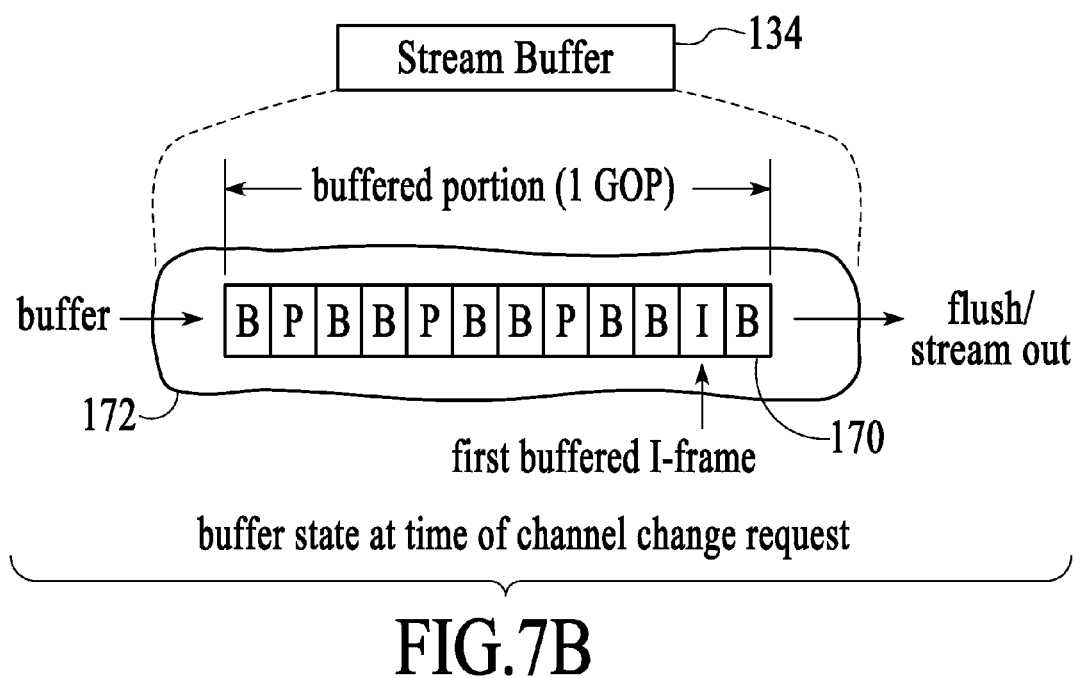
Figure 7C:
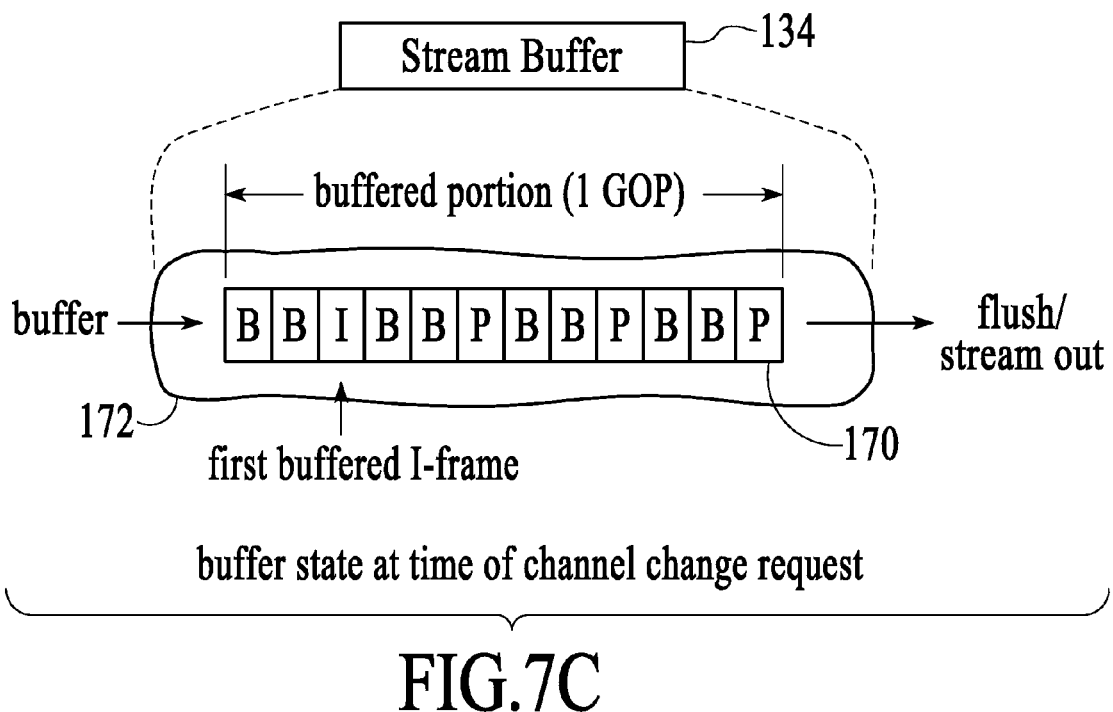

An embodiment of the process of servicing a channel change request via unicasting is now described with reference to FIGS. 7A-7C. FIG. 7A depicts the stream buffer 134 of the stream server 106 and a portion of one of the ingested streams, for example, the digital video content for channel 2. In an embodiment, the stream buffer buffers up to 1 group of pictures (GOP) worth of each ingested stream, where a GOP is defined as a series of multiple consecutive frames beginning with an I-frame and continuing until the last fame before the next I-frame. As depicted in FIG. 7A, the buffered portion of the digital video content 172 includes 12 frames 170 consisting of one I-frame, three P-frames, and eight B-frames, although more frames could be buffered. In this embodiment, the stream buffer is a continual moving buffer whose width is sufficient to assure that at least one I-frame (or I-frame equivalent) is contained within the buffer at any point in time. The stream buffer could alternatively be larger than one GOP, thereby ensuring that more than one I-frame is contained within the buffer at any point in time. Note that the exact location of the I-frame relative to other frames in the buffer will vary with time.

In the convention used in FIG. 7A, frames are received into the buffer 134 on the left side and flushed from the buffer or streamed out of the buffer from the right side. Therefore, the age of the frames in the buffer decreases from right to left such that the rightmost frame has been buffered for the most amount of time and the leftmost frame has been buffered for the least amount of time.

As described above, a channel change request is serviced by providing digital video content related to the requested channel to the client 112 via unicasting instead of multicasting. In particular, the unicast session starts with the first buffered I-frame and continues with the buffered frames that come after the first I-frame. FIG. 7B depicts the state of a channel-specific buffer at the time a channel change request is received. In order to achieve a fast channel change, the unicast session begins with the first buffered I-frame and continues with the frames 170 (including B, P, and I frames) that consecutively follow the first I-frame. In an embodiment, the buffered portion of the digital video content is wide enough to include at least one I-frame (or an I-frame equivalent). FIG. 7C depicts the state of the channel-specific buffer 134 when a channel change request is received at a different time than in FIG. 7B. FIG. 7C illustrates that the first buffered I-frame can be located in different positions throughout the buffered frames depending on the time at which the channel change request is received.

In an embodiment, the server system is configured such that the multicast streams are streamed out slightly ahead of any unicast streams. That is, duplicate frames of digital video content will be streamed via multicasting slightly before the corresponding frames are streamed via unicasting. As will be seen, the fact that multicast streams are slightly ahead of their corresponding unicast streams can be used advantageously to transition the client from unicasting to multicasting without skipping a frame.

Switching from unicasting back to multicasting may be accomplished using many different techniques. Although there are many different techniques that can be used to switch from unicasting back to multicasting, it is desirable to make the switch without causing any disruption to the playout of the digital video content by the client 112. For example, it is desirable to avoid skipping any frames that make up the stream of digital video content. A seamless switch from unicasting back to multicasting can be accomplished, for example, using one of the techniques described below.

A first technique for switching a client from unicasting back to multicasting involves accumulating enough digital video content at the client to bridge the time it takes to transition from receiving the digital video content via unicasting to receiving the digital video content via multicasting. The transition time is a function of the network specifics. For example, in HFC networks that utilize RF for local delivery of digital video content to the clients, the transition time is a function of how long it takes to retune the tuner to a new channel. In IP-based networks, the transition time is a function of how long it takes to join the client to the corresponding multicast group. In accordance with an embodiment of the invention, digital video content is accumulated at the client by temporarily increasing the stream rate of the unicast stream above the playout rate. While the digital video content is being streamed at the increased rate, the amount of digital video content stored in the client's stream buffer grows (as opposed to staying the same, which is the case when the stream rate is the same as the playout rate). That is, the number of frames in the client's stream buffer increases while the stream rate is increased. The stream rate is held at the increased rate until the client accumulates enough frames in its buffer to be able to bridge the time it takes to transition from receiving the digital video content via unicasting to receiving the digital video content via multicasting. For example, if the transition time from unicasting to multicasting is approximately 1 second, then the stream rate is increased until the client is able to accumulate at least 1 second worth of frames in the stream buffer. In an embodiment, the transition time includes the time required to make the switch from unicasting to multicasting plus the maximum delay that can be attributed to waiting for the next I-frame to arrive at the client (e.g., equal to the time of one GOP).

Figure 8:
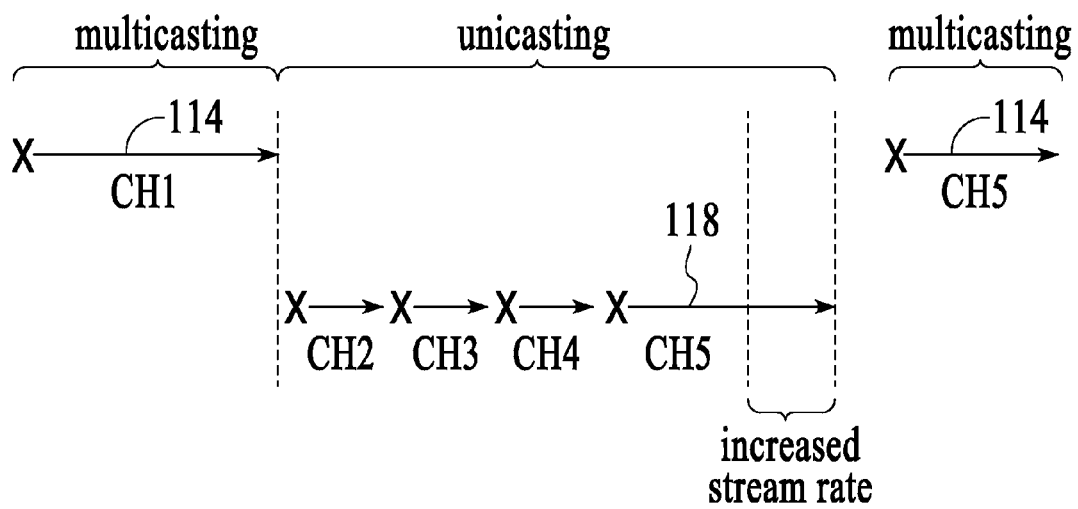
FIG. 8 illustrates a technique for switching a client from unicasting back to multicasting in accordance with an embodiment of the invention.

Operation of this technique is described with reference to FIGS. 8 and 9A-9D. Referring to FIG. 8, the client is initially receiving channel 1 via multicasting 114. At some point the client requests a channel change to channel 2. In response to the channel change request and as described above, channel 2 is provided to the client via unicasting 118. Additional channel change requests to channels 3, 4, and 5 are also serviced via unicasting. At some point, the transition back to multicasting is initiated and the stream rate of the unicasting stream is increased so that the client can accumulate enough frames to bridge the transition from unicasting to multicasting. As the client is accumulating frames, the client continues to playout buffered frames that were received via unicasting. When enough additional frames have been accumulated via unicasting, the client disables reception of the unicast stream and initiates a process to terminate unicasting and receive the digital video content related to the current channel via multicasting. During the transition time between when the unicast stream is terminated and before the multicast stream is received, no frames are received at the client and the client plays out the buffered frames that were accumulated in the buffer via unicasting. When the client begins receiving frames via multicasting, the received frames are written into a separate multicast buffer. In an embodiment, an identification is made in the client between the initial multicasting time point and the corresponding time point in the unicast stream. When the unicast stream has played out to this time point, playout switches to the multicast buffer. At this point, the transition to multicasting is complete and the remaining frames in the unicast buffer may be flushed as they are no longer needed for playout. The above-described technique is especially applicable to clients that are limited to receiving a single stream at a time and to cases with limited bandwidth headroom constraint (e.g., DSL).

Figure 9A:
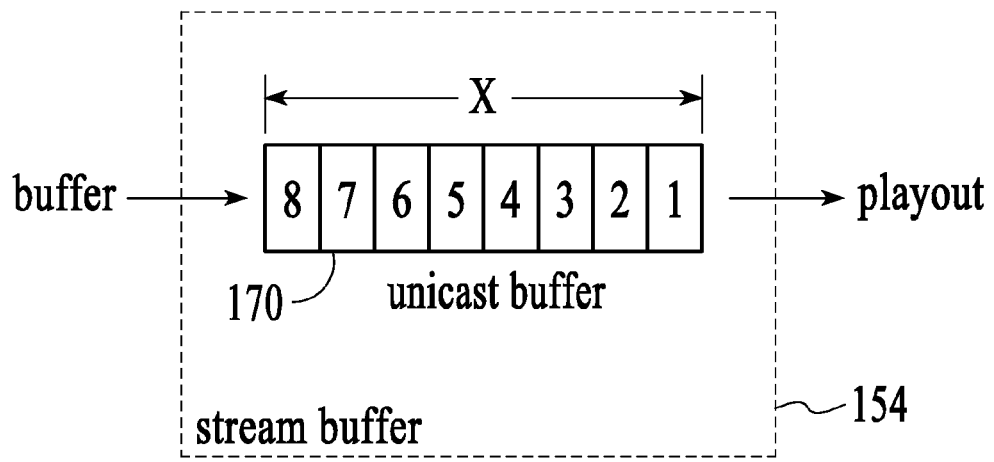
FIGS. 9A-9D depict exemplary states of the client's stream buffer with respect to the technique described with reference to FIG. 8.

Exemplary states of the client's 112 stream buffer 154 are illustrated with respect to this technique in FIGS. 9A-9D. FIG. 9A depicts a unicast buffer that is in steady state. In steady state, the rate of frame playout is roughly equal to the rate of frame buffering and therefore the depth, x, of the buffer is static. It should be noted that in some implementations, the buffer depth is virtually zero before the rate increase. That is, there is relatively little if any buffering of frames. The technique described herein is applicable regardless of whether or not unicast frames are buffered.

Figure 9B:
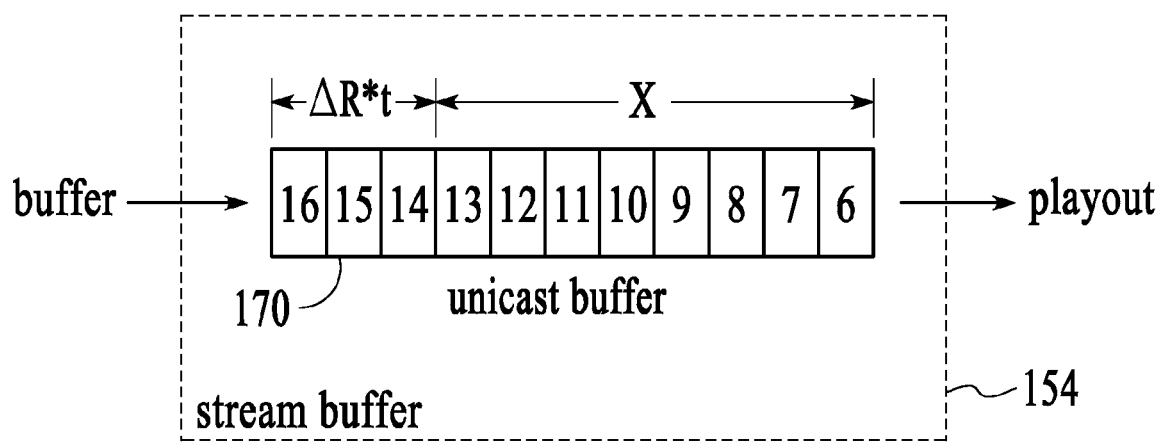
Figure 9C:
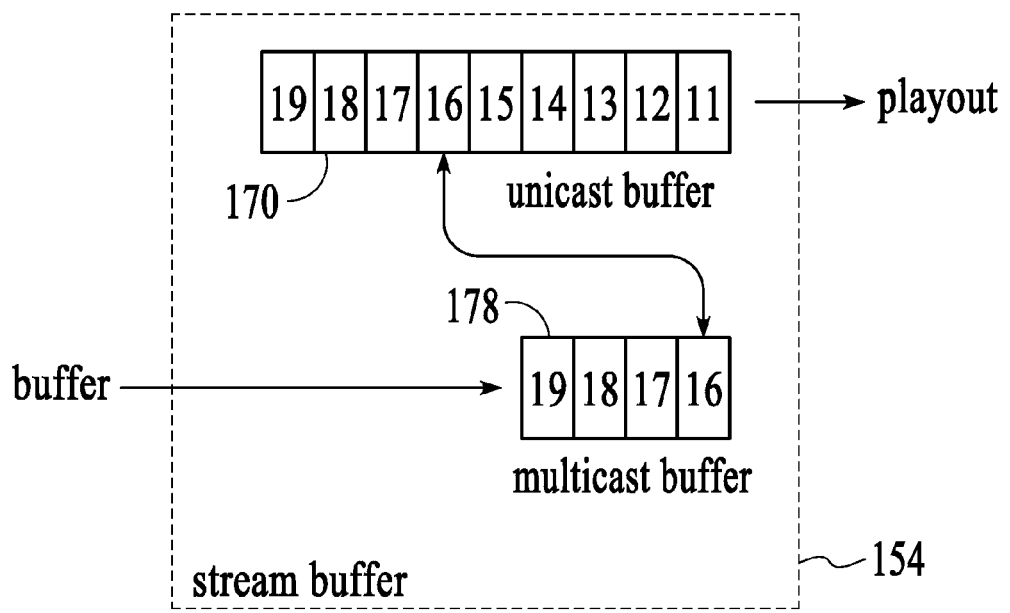
Figure 9D:
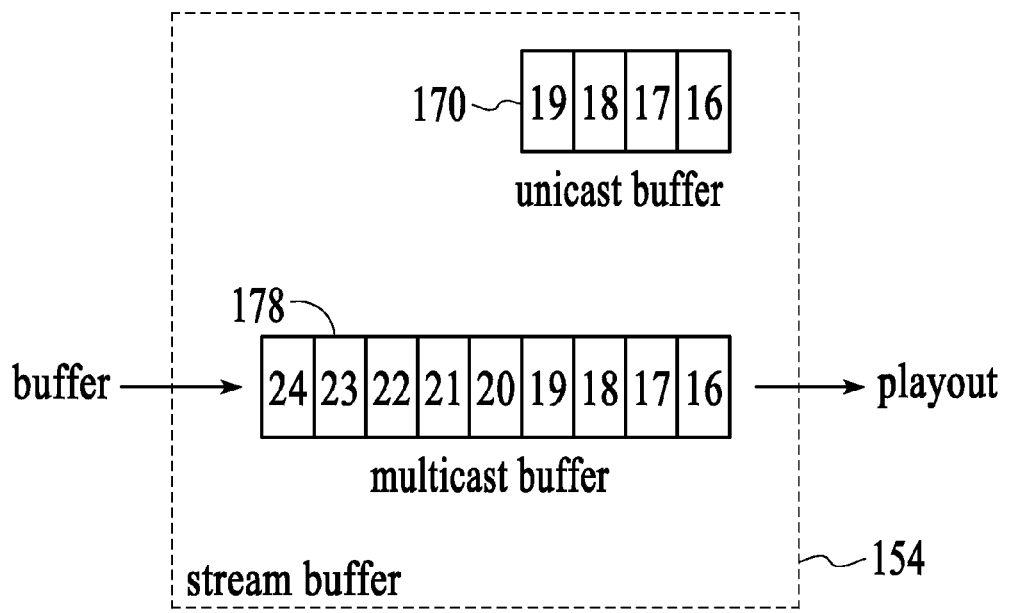

FIG. 9B depicts the unicast buffer after receiving frames at an increased rate for a time interval of t. The depth of the buffer after time interval t is the rate increase ($\Delta R$) multiplied by the time interval t plus the steady state depth x, or buffer depth=$\Delta R * t + x$. FIG. 9C depicts the unicast buffer and a multicast buffer that is initiated in response to the switch from unicasting to multicasting. In FIG. 9C, the unicast buffer is no longer receiving new frames while the multicast buffer is just beginning to receive new frames. The client continues to playout from the unicast buffer until it reaches the point at which it can transition to playing out from the multicast buffer without skipping a frame. As illustrated in FIGS. 9C and 9D, the client can stop playing out of the unicast buffer after frame 15 and can begin playing out of the multicast buffer at frame 16.

Although in this embodiment, the process of switching to multicasting is initiated right after the client accumulates enough frames, in other embodiments, the client may wait to initiate the switch. Although a two buffer implementation is described with reference to FIGS. 9A-9D, other implementations are possible. The above-described technique for switching from unicasting to multicasting applies also to network protocols that use variable bit rate (VBR) schemes as long as the amount of content in the buffer is increased.

A second technique for switching a client from unicasting back to multicasting involves simultaneously providing the digital video content to the client via unicasting and multicasting until the client has buffered duplicate frames (i.e., frames that contain the same digital video content). Once the client has buffered duplicate frames, the client can transition from playing out of a buffer that holds frames received via unicasting to playing out of a buffer that holds frames received via multicasting without skipping a frame. Once the transition back to multicasting is complete, unicasting is terminated and any frames remaining in the unicast buffer are flushed.

Figure 10:
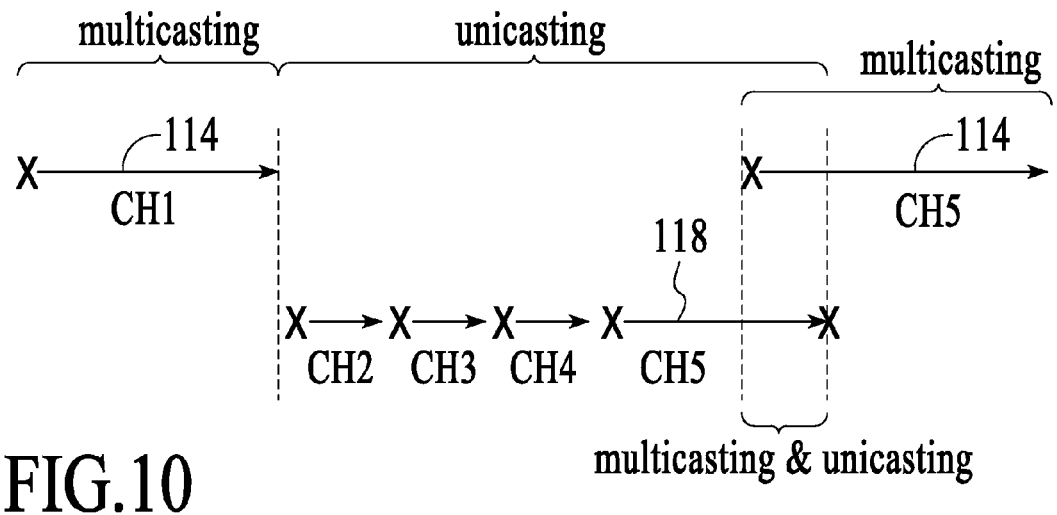
FIG. 10 illustrates another technique for switching a client from unicasting back to multicasting in accordance with an embodiment of the invention.

Operation of this technique is described with reference to FIGS. 10 and 11A-11D. Referring to FIG. 10, the client is initially receiving channel 1 via multicasting 114. At some point the client requests a channel change to channel 2. In response to the channel change request and as described above, channel 2 is provided to the client via unicasting 118. Additional channel change requests to channels 3, 4, and 5 are also serviced via unicasting. At some point, the transition back to multicasting is initiated and for a limited period of time, a multicast stream is provided to the client concurrent with the unicast stream. Assuming the multicast stream is ahead of the unicast stream in time, the frames received via multicasting have not yet been displayed (i.e., the corresponding frames in the unicast buffer have not yet been played out). The client receives and buffers the digital video content via both unicasting and multicasting until the client begins to buffer duplicate frames via unicasting and multicasting. In an embodiment, the client buffers digital video content received via both unicasting and multicasting for a period of approximately 0.5 to 2 seconds. While the client is receiving frames via both unicasting and multicasting, the frames are buffered in respective unicast and multicast buffers. Once the client begins to buffer duplicate frames, the client can switch to playing out frames from the multicast buffer instead of the unicast buffer without skipping a frame. Once the client switches to playing out frames from the multicast buffer, unicasting to the client can be terminated and the unicast buffer can be flushed.

Figure 11A:
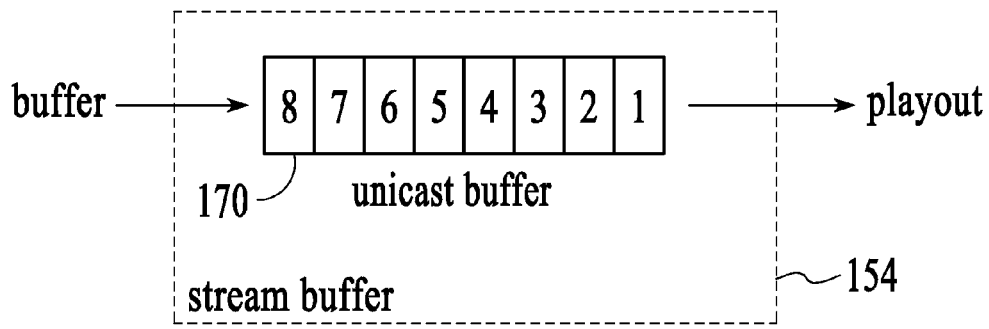
FIGS. 11A-11D depict exemplary states of the client's stream buffer with respect to the technique described with reference to FIG. 10.

Exemplary states of the client's stream buffer 154 related to this technique are illustrated in FIGS. 11A-11D. FIG. 11A depicts the stream buffer with only a unicast buffer active. At this point in time, the client is receiving frames 170 via unicast only. It should be noted that in some implementations the unicast buffer is maintained essentially at zero frames, that is, there is very little if any buffering of frames. The technique described herein is applicable regardless of whether or not unicast frames are buffered.

Figure 11B:
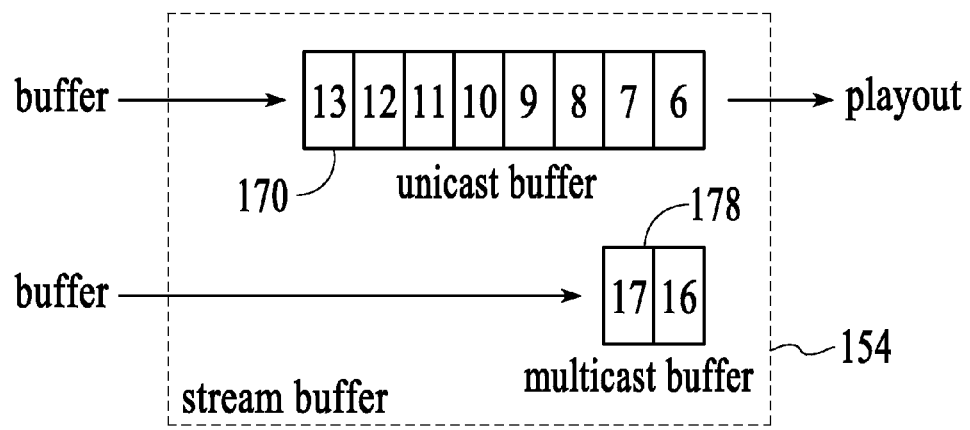
Figure 11C:
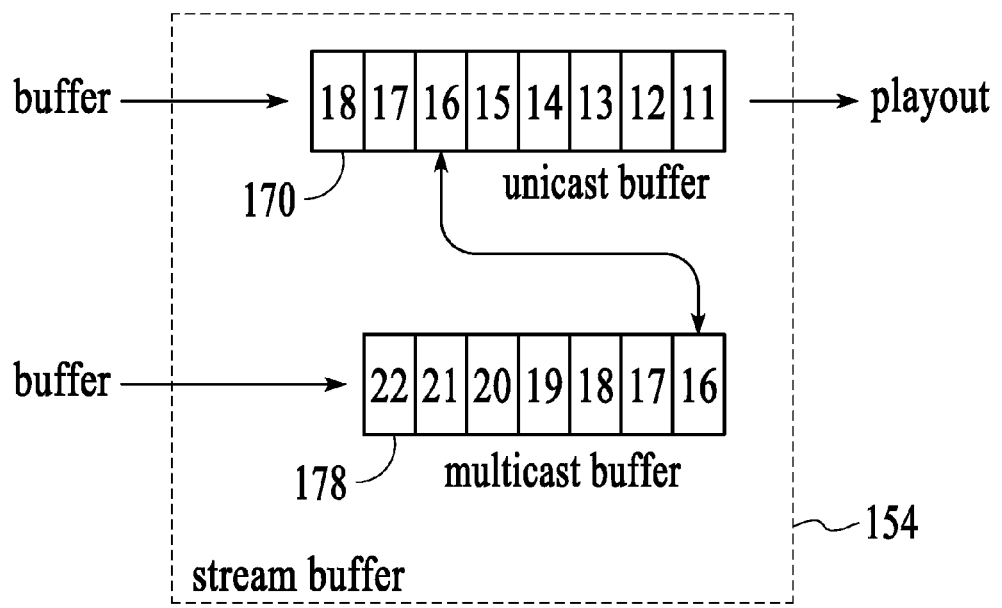
Figure 11D:
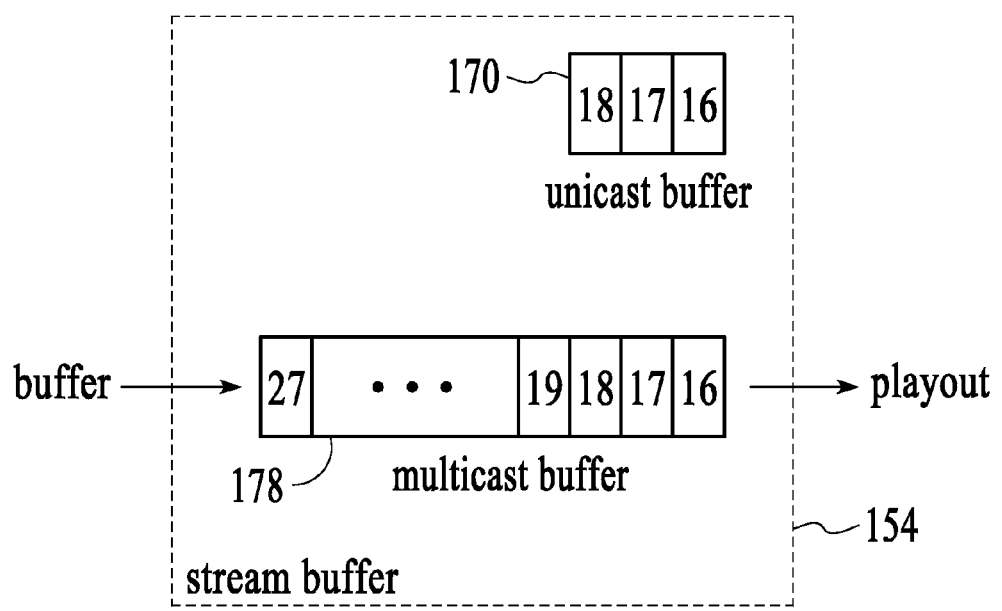

Once the client begins to receive digital video content related to the current channel via multicasting in addition to unicasting, the multicast frames are buffered in a multicast buffer. FIG. 11B depicts the stream buffer 154 with both a unicast buffer and a multicast buffer. As depicted in FIG. 11B, frames 170 and 178 are received into both the unicast and multicast buffers but only played out of the unicast buffer. At some point, the unicast and multicast buffers begin to buffer duplicate frames. For example, FIG. 11C depicts the unicast and multicast buffers having duplicate frames starting at frame 16. Once the unicast and multicast buffers contain duplicate frames, the playout controller 164 can transition to playing out from the multicast buffer. In an embodiment, the transition to the multicast buffer can occur at the first duplicate frame (e.g., frame 16 in FIG. 11C). Alternatively, the transition can be made at any convenient point. FIG. 11D depicts the stream buffer after the unicast buffer has stopped receiving new frames and after playout has switched to the multicast buffer.

The join operation involves making a unique identification between a frame in the unicast buffer and the corresponding and identical frame in the multicast buffer. For this purpose, the minimum size of data required to effect a matching operation is defined as an Identification Quantum (IDQ). The IDQ represents the smallest amount of data required in order to be able to guarantee that a match between frames is unique. Selection of an IDQ type may be according to a list of choices, known to those skilled in the art. These include, but are not limited to: 1) a CRC or MD5 checksum, or other condensed representation, of the data contained within a single transport packet or within multiple packets, 2) a vector consisting of, but not limited to, one or more of the following fields: a transport packet continuity counter, a picture temporal reference, a picture type (I,P,B, etc.), an absolute stream offset from start, where the vector represents a unique frame start identifier, and 3) an in-stream marker bit or bits, or a set of the same (this is possible if the server is able to manipulate the contents of the multicast buffer).

One consequence of buffering the multicast frames and switching to the multicast buffer once duplicate frames arrive is that the timeline of the displayed digital video content is permanently time shifted by the interval that resulted from the first channel change. This delay can be expected to be on the order of from zero to the maximum GOP size (e.g., 1-2 seconds). The above-described technique is especially applicable to clients that are capable of concurrently receiving two different streams and to cases in which adequate bandwidth headroom is temporarily available (e.g., fiber or dual RF/IP path).

The processor 130, 150 within the channel change server 108 and client 112 may include a multifunction processor and/or an application specific processor that is operationally connected to the memory 132, 152. The processor performs functions, such as executing software code, which are well-known in the field. The memory within the channel change server and the client may include circuits for storing processor-executable instructions, for buffering digital video content, and for storing data structures. Although the processor and memory are depicted as separate functional units, in some instances, the processor and memory are partially or fully integrated onto the same device.

With reference to FIG. 3, the buffer controller 136, channel change request detector 138, channel change request handler 140, and multicast return controller 142 may be embodied as processor-executable instructions that are stored on processor-accessible memory media. Likewise, with reference to FIG. 4, the buffer controller 156, channel change requestor 158, multicast return controller 162, and playout controller 164 may be embodied as processor-executable instructions that are stored on processor-accessible memory media. Additionally, although the above-identified functional elements are depicted as separate elements in FIGS. 3 and 4, the elements can be integrated with each other or stored in fragments throughout the server system 104, distribution network 110, and/or clients 112. Processor-executable instructions generally include programs, protocols, data structures, routines, objects, and interfaces that can perform and/or enable certain useful functions.

The above-described techniques for servicing channel change requests can be applied to any type of distribution network that is able to distribute digital video content via multicasting and unicasting. The return to multicasting can be a one-sided operation that is accomplished entirely by the server system 104 and/or the client 112 or it can be a two-sided operation that involves communications between the server system and the corresponding client. The server system depicted in FIGS. 1A-1F can be a single server or a combination of servers. If the server system is a combination of servers, the servers may be co-located or distributed across a network.

In FIGS. 1A-1F, the stream server 106 provides the multicast streams into the distribution network 110. In another embodiment, multicast streaming bypasses the stream server. The above-described technique of waiting to switch from providing digital video content to a client 112 via multicasting 114 to providing digital video content to the client via unicasting 118 until a pre-established condition is met is applicable whether the stream server provides the multicast streams to the distribution network or whether multicast streaming bypasses the stream server.

Figure 12:
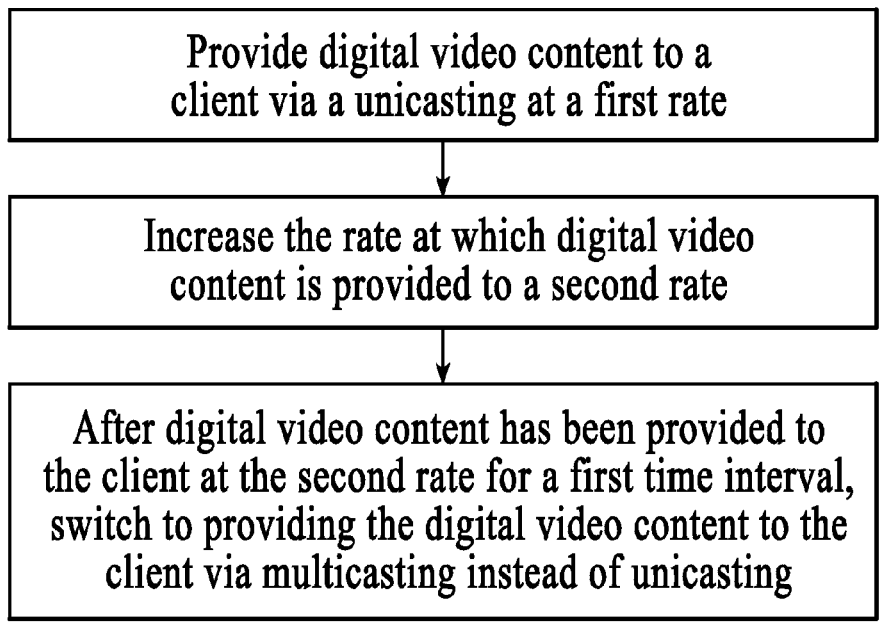
FIG. 12 is a process flow diagram of a method for servicing a channel change request in a digital video network in accordance with an embodiment of the invention.

FIG. 12 is a process flow diagram of a method for servicing a channel change request in a digital video network in accordance with an embodiment of the invention. At block 1202, digital video content is provided to a client via unicasting at a first rate. At block 1204, the rate at which digital video content is provided is increased to a second rate. At block 1206, after digital video content has been provided to the client at the second rate for a first time interval, a switch is made to providing the digital video content to the client via multicasting instead of unicasting.

Figure 13:
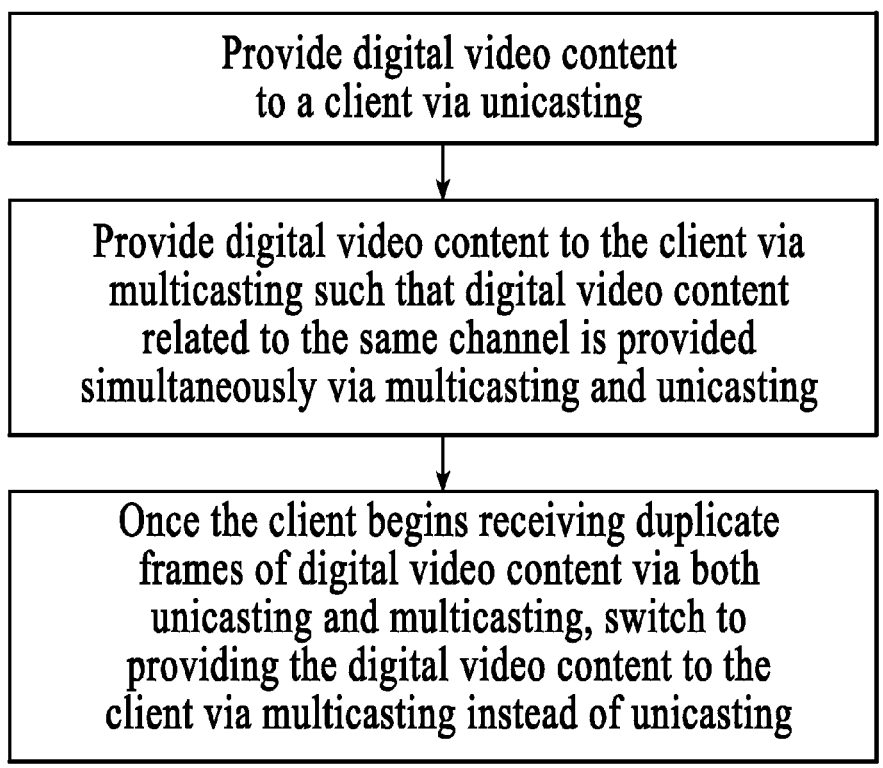
FIG. 13 is a process flow diagram of another method for servicing a channel change request in a digital video network in accordance with another embodiment of the invention.

FIG. 13 is a process flow diagram of another method for servicing a channel change request in a digital video network in accordance with another embodiment of the invention. At block 1302, digital video content is provided to a client via unicasting. At block 1304, digital video content is provided to the client via multicasting such that digital video content related to the same channel is provided simultaneously via multicasting and unicasting. At block 1306, once the client begins receiving duplicate frames of digital video content via both unicasting and multicasting, a switch is made to providing the digital video content to the client via multicasting instead of unicasting.

Although the stream server 106 is depicted as a single entity for description purposes, the stream server may be implemented as a single server or multiple servers that act collectively to stream digital video content to the clients.

As described above, it is important to the viewer experience to be able to achieve a fast channel change in a digital video network. In addition to the channel change being fast, the quality of the displayed video after the channel change must also be maintained.

Two techniques for maintaining the quality of streaming digital video content are forward error correction (FEC) and retransmission. Forward error correction is a technique for maintaining the quality of streaming digital video content that involves adding redundant data to a transmission that enables the receiver to detect and correct errors in received data without requiring additional data from the transmitter. The strength of an FEC protocol is typically a function of the volume of redundant data that is added to the primary data stream, with more redundant data resulting in stronger FEC, e.g., better error correction capability. Many different FEC schemes exist, including, for example, schemes that are media-independent, schemes that are media-specific, schemes that utilize block coding, and schemes that utilize convolution coding. Block coding works on fixed size blocks of bits or symbols of predetermined size and convolution coding works on bit or symbol streams of arbitrary length.

Figure 14:
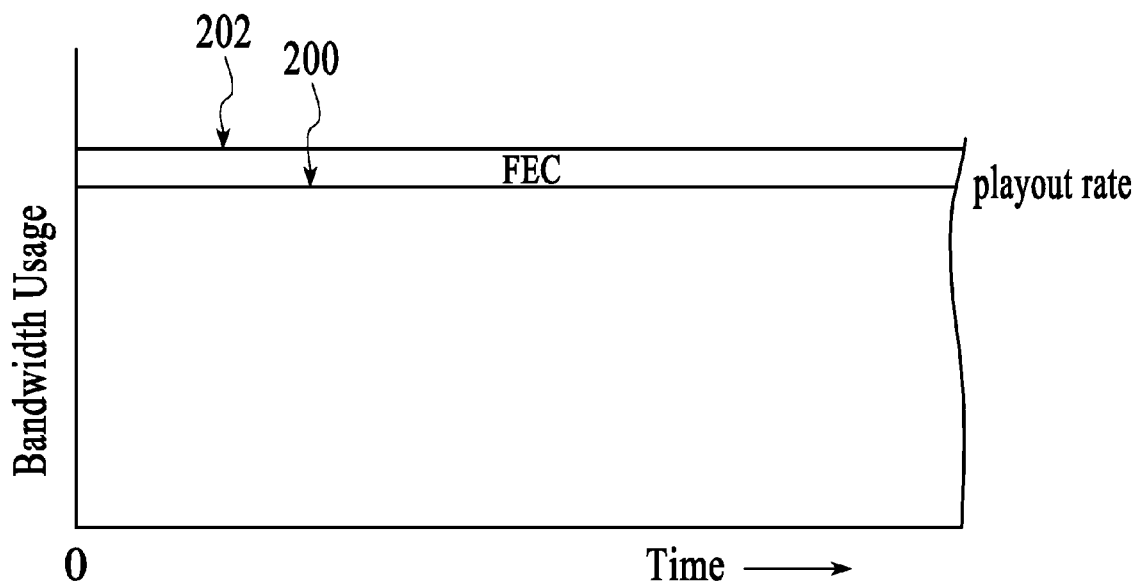
FIG. 14 is a graph of bandwidth usage versus time for a stream that is provided to a client at a rate that supports normal playout at the client and that includes forward error correction.

Using FEC to maintain the quality of streaming digital video content increases the bandwidth required to transmit the same amount of digital video content to a client. FIG. 14 is a graph of bandwidth usage 200 versus time for a stream that is provided to a client at a rate that supports normal playout at the client, referred to herein as the "playout rate." FIG. 14 also illustrates the increased bandwidth usage 202 over the playout rate that is contributed from FEC when FEC is used to stream the digital video content to the client. Although FEC improves the bit error ratio (BER) as compared to streams that do not use FEC, as illustrated in FIG. 14, FEC also increases the bandwidth usage of the stream. FEC can increase the bandwidth usage over a stream that does not use FEC by 5-20% depending on the FEC algorithm used and the level of error protection that is desired. Further, the increase in bandwidth usage continues for as long as FEC is used. In addition to increasing the bandwidth usage, FEC also consumes significant amounts of processing resources during FEC encoding and FEC decoding. The increase in processing resources can be significant at the stream server when FEC is applied to multiple different unicast streams. Further, the processing resource requirements increase with stronger FEC protocols.

Figure 15:
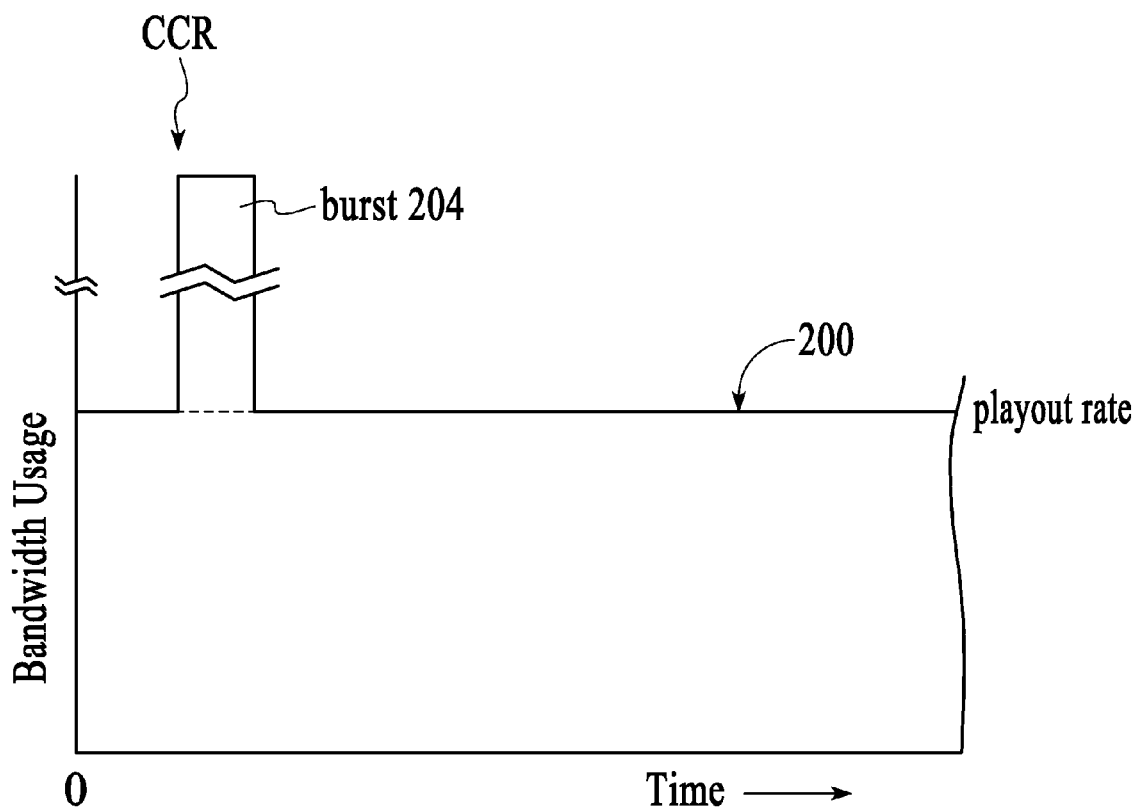
FIG. 15 illustrates the bandwidth usage when a client buffer is filled by a burst of digital video content that is sent immediately upon detecting a channel change request (CCR).

Retransmission is a technique for maintaining the quality of streaming digital video content that involves the retransmission of frames that are lost, damaged, or otherwise received with an unacceptably high BER. When a retransmission protocol is used after a channel change, a certain amount of digital video content must be buffered at the client before the retransmission protocol can be relied upon to provide effective error protection. The buffered digital video content is needed to provide a sufficient amount of time to complete the retransmission of lost or damaged frames back to the client before the digital video content carried in the frames is needed for playout at the client. If digital video content is streamed to the client at the playout rate, waiting for the client buffer to fill can negatively affect the channel change process. For example, the channel change can be delayed until the client buffer is sufficiently filled or the requested channel can be played out for an initial period without the benefit of retransmission of lost or damaged frames. A client buffer could be rapidly filled by sending a large initial burst of digital video content to the client immediately upon detecting a channel change request. FIG. 15 illustrates the bandwidth usage when a client buffer is filled by a burst 204 of digital video content that is sent immediately upon detecting a channel change request (CCR). As shown in FIG. 15, the burst involves a short but relatively large increase in bandwidth usage above the playout rate. Although it is possible to transmit a large burst of digital video content to rapidly fill a client buffer immediately upon detecting each channel change request, this approach does not scale well in a multiclient digital video network.

In accordance with an embodiment of the invention, a technique for servicing a channel change request in a streaming digital video network involves using FEC for a limited initial period after detecting a channel change request and then switching to a retransmission protocol at the end of the limited initial period. FEC helps to maintain the quality of digital video content for the requested channel immediately upon executing the channel change and thereby supports a high-quality fast channel change. In particular, the client does not have to wait for a buffer to fill and can therefore immediately begin decoding and displaying received digital video content for the requested channel. In an embodiment, FEC continues to be used until a buffer at the client is sufficiently populated such that lost or damaged frames can be retransmitted to the client before the corresponding digital video content is needed for playout. While FEC is used, the client buffer can be populated by a relatively small increase in the stream rate over the playout rate and without a large burst of frames. Once the client buffer is adequately populated, FEC is ended and retransmission is used to maintain the quality of the streamed digital video content. Using FEC for a limited initial period provides error protection immediately upon detecting the requested channel without imposing long term processing and bandwidth drains on the network. The use of FEC for the limited initial period also allows time for the client buffer to be filled without having to send a large burst of frames to the client. Additionally, using retransmission after the limited initial period ends provides long term error protection in a bandwidth effective manner.

Figure 16:
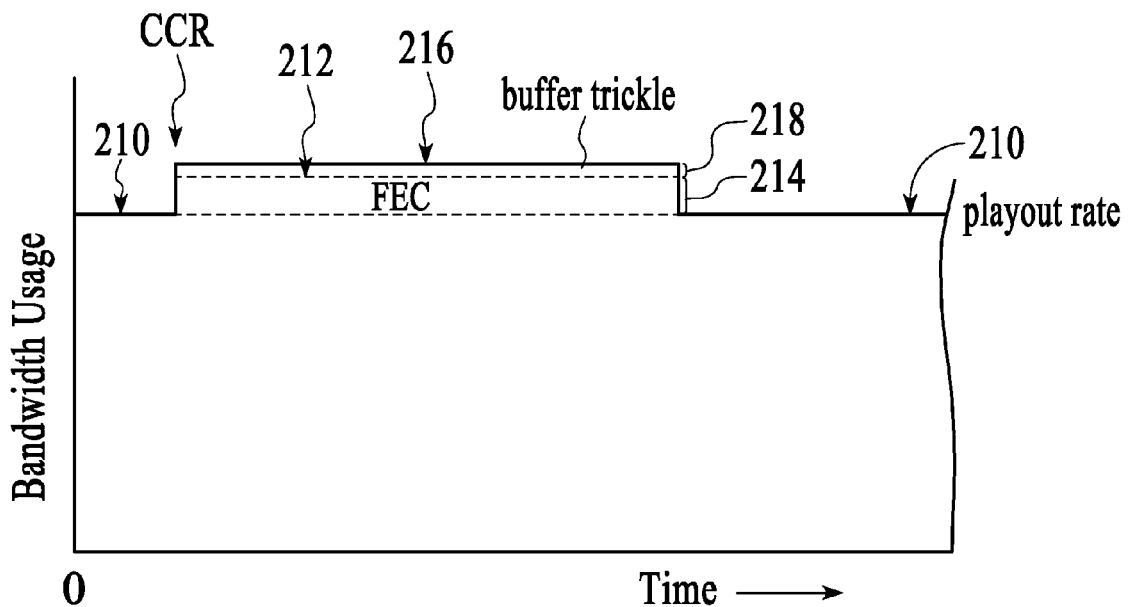
FIG. 16 is a graph of bandwidth usage versus time for a stream that is provided to a client using forward error correction for a limited initial period in accordance with an embodiment of the invention.

An embodiment of a technique for servicing a channel change request is described with reference to FIG. 16. As illustrated in FIG. 16, the bandwidth usage 210 for a streamed channel of digital video content is at or near the playout rate before a channel change request (CCR) is detected. When digital video content is streamed at the playout rate, the client buffer does not accumulate digital video content because content is consumed at the same rate that it is received. Upon detecting a channel change request, the digital video content for the requested channel begins to be streamed to the client (via unicasting as described above with reference to FIGS. 1-13) using FEC. The use of FEC increases the bandwidth required to stream the digital video content related to the requested channel over the bandwidth usage of the playout rate. The increase in the bandwidth usage 212 over the playout rate is reflected in this example by the differential 214. Although the bandwidth usage is greater than the playout rate, the increased stream rate does not provide extra digital video content to the client. That is, the extra bandwidth usage is attributed to FEC and not to the transmission of more digital video content. In addition to triggering FEC, the channel change request triggers the stream rate of the digital video content to be increased above the playout rate as indicated in this example by the differential 218. The stream rate is increased above the playout rate so that digital video content is streamed to the client in excess of the playout rate. As opposed to the increased bandwidth usage attributed to FEC, the increased bandwidth usage 216 attributed to this increase in the stream rate does provide digital video content to the client in excess of the playout rate. The digital video content in excess of the playout rate is accumulated in the client buffer and the increase in the stream rate over the playout rate is referred to herein as the "buffer trickle." The buffer trickle enables the client buffer to be populated concurrent with the playout of the digital video content related to the requested channel. The buffer trickle can be expressed as an incremental rate above the playout rate (e.g., in Mbps) or as a percentage of the playout rate (e.g., 1% above the playout rate). In an embodiment, the buffer trickle is an increase in the playout rate of 1-10% although other ranges are possible. This increase in the stream rate is much less than a typical burst, which can be 30%-100% or more, above the playout rate.

As described above, FEC is used for a limited initial period to maintain the quality of the streaming digital video content.

For example, FEC is used until the client buffer is sufficiently populated such that lost or damaged frames can be retransmitted to the client before they are needed for playout. In an embodiment, the amount of digital video content that must be buffered to ensure that lost or damaged frames can be retransmitted to the client before they are needed for playout is indicated by a pre-established threshold. The pre-established threshold may be expressed, for example, in terms of the quantity of buffered digital video content at the client, the quantity of space available in the buffer, the utilization percentage of the client buffer, playout time of the buffered digital video content, the amount of time that the buffer trickle has been active, or some other criteria. Whatever the parameter, once the client buffer is populated to the pre-established threshold, the limited initial period ends and FEC is no longer used to provide digital video content to the client. Other actions that could trigger the end of the limited initial period include, for example, the expiration of a pre-established time interval or when digital video content related to the requested channel is switched from being provided to the client via unicasting to being provided to the client via multicasting. In an embodiment, the ending of FEC is triggered by the expiration of a time interval in the range of 20-30 seconds.

In the embodiment of FIG. 16, the trigger for ending FEC is the filling of the client buffer to the pre-established threshold. As illustrated in FIG. 16, the "buffer trickle" is ended simultaneously with the ending of FEC. Because the client buffer is filled when FEC ends, lost or damaged frames can be effectively recovered using a retransmission protocol as soon as FEC ends. Retransmission protocols only increase the bandwidth usage to the extent that frames are retransmitted and therefore retransmission protocols are generally more bandwidth effective than FEC. Additionally, because FEC has been ended, the processing requirements and the bandwidth usage associated with FEC are eliminated.

At some point after the requested channel has been provided to the client, the client can be switched from unicasting to back to multicasting. For example, the client can be switched from unicasting back to multicasting using one of the techniques described above with reference to FIGS. 8-13. The switching from unicasting back to multicasting may be the trigger to end FEC.

Figure 17:
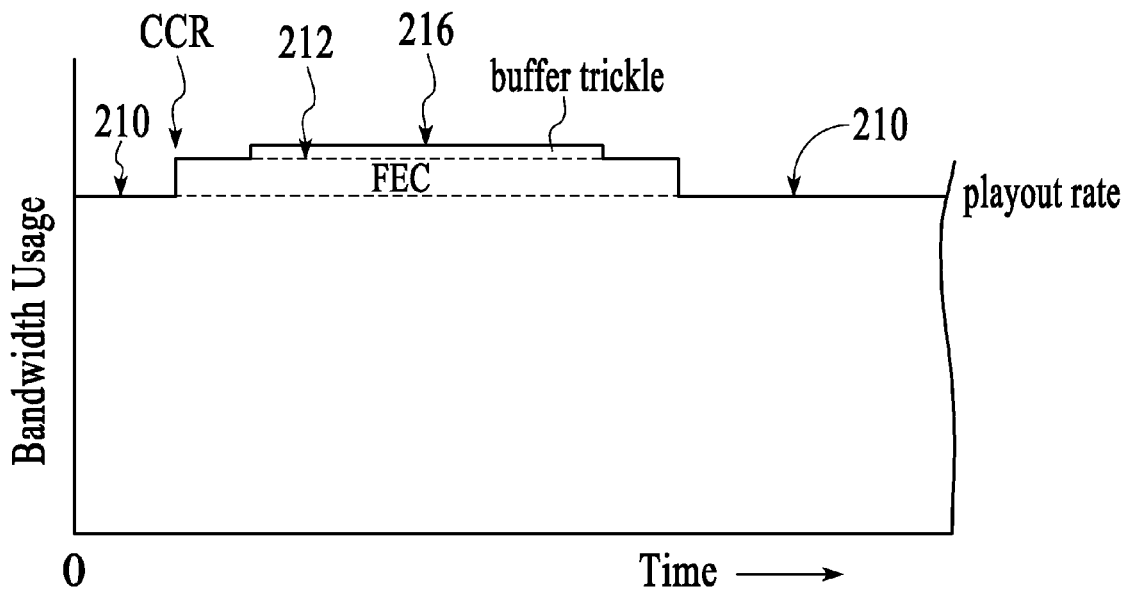
FIG. 17 is a graph of bandwidth usage versus time for a stream that is provided to a client using forward error correction for a limited initial period in accordance with another embodiment of the invention.

In another embodiment, the addition of the buffer trickle is not simultaneous with the beginning of FEC and the ending of the buffer trickle is not simultaneous with the ending of FEC. For example, FIG. 17 depicts a graph of bandwidth usage 210, 212, 216 in which FEC begins immediately upon detection of a channel change request (CCR) while the buffer trickle starts some time after the channel change request. Likewise, as illustrated in FIG. 17, FEC can continue to be used after the buffer trickle has ended.

Figure 18:
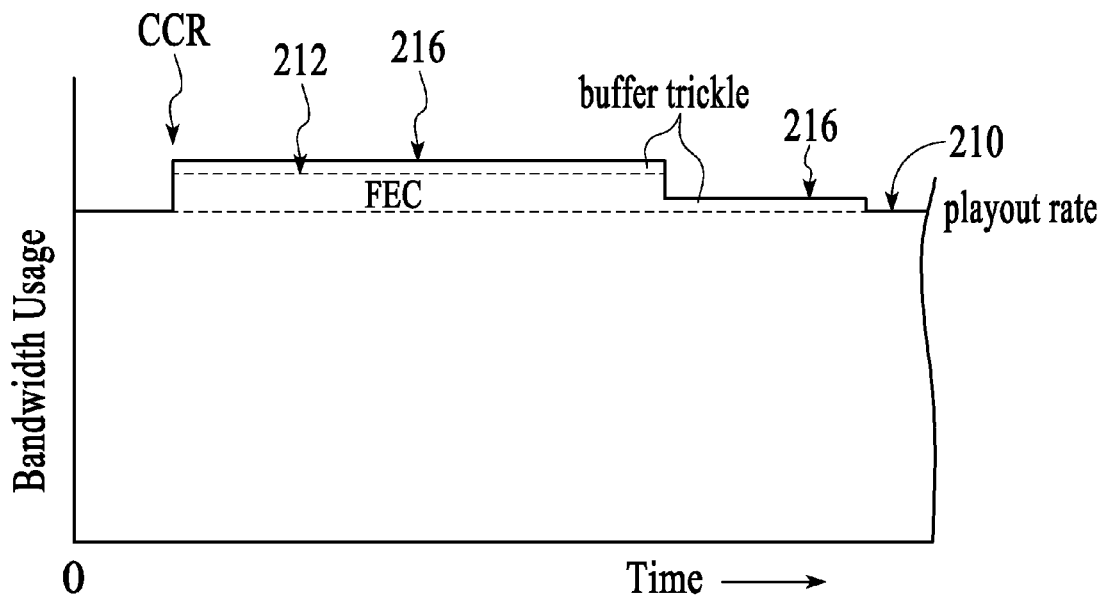
FIG. 18 is a graph of bandwidth usage versus time for a stream that is provided to a client using forward error correction for a limited initial period in accordance with another embodiment of the invention.

In another embodiment, it may be that the client buffer is filled enough to support retransmission but is not filled enough to support another operation such as a switch from unicasting to multicasting. In this case, FEC may be ended when the client buffer has reached a pre-established threshold that is specific to error protection while the buffer trickle is continued. FIG. 18 illustrates bandwidth usage in the case where the buffer trickle continues longer than FEC. As illustrated in FIG. 18, FEC and the buffer trickle are initiated immediately upon detecting a channel change request CCR). FEC continues until a limited initial period ends. For example, the limited initial period ends upon the expiration of a pre-established time interval or when the client buffer reaches a pre-established threshold that ensures lost or damaged frames can be retransmitted to a client before they are needed for playout. Once the limited initial period ends, FEC is ended but the buffer trickle continues. For example, the buffer trickle continues until enough digital video content has been buffered to support switching the client from unicasting back to multicasting.

Figure 19:
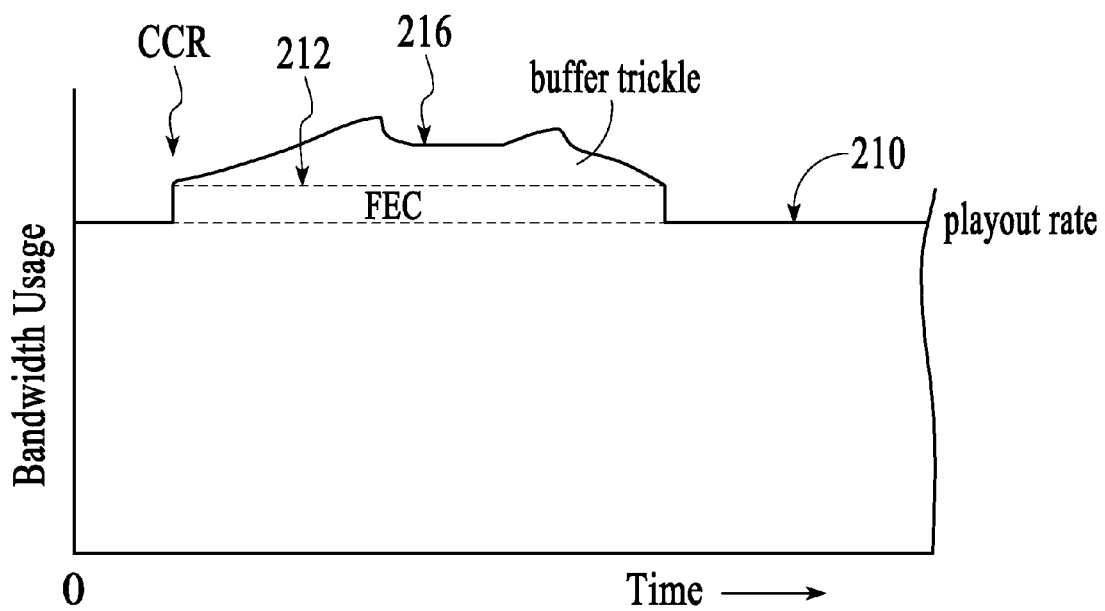
FIG. 19 is a graph of bandwidth usage versus time for a stream that is provided to a client using forward error correction for a limited initial period in accordance with another embodiment of the invention.

In the examples described with reference to FIGS. 16-18, the buffer trickle contributes a constant increase in the bandwidth usage rate above the playout rate. In an alternative embodiment, the buffer trickle contributes a variable increase in the bandwidth usage. FIG. 19 illustrates a buffer trickle that contributes a variable increase to the bandwidth usage 216 of a stream that uses FEC. The rate of the buffer trickle can be dynamically varied in response to, for example, network conditions, link conditions, BER, and/or the desired quality of service. Although the buffer trickle is variable, it is still kept in a range that is below the bandwidth usage of a typical burst.

The graphs of FIGS. 14-19 are provided for description purposes and are not necessarily to scale. Additionally, although some examples of usage profiles are provided, other usage profiles are possible. For example, usage profiles that are a combination of any of the profiles described with reference to FIGS. 16-19 are possible.

Figure 20:
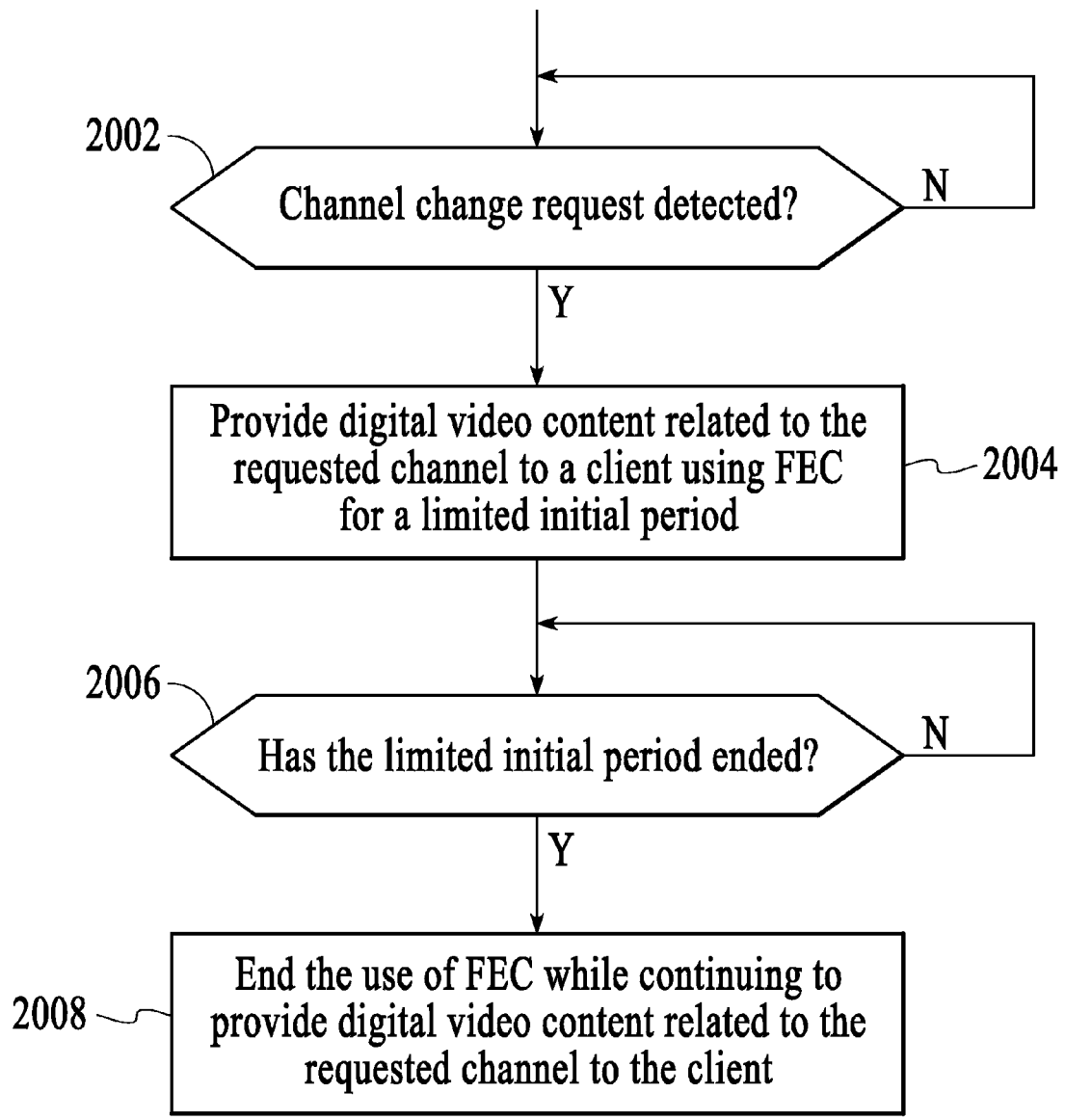
FIG. 20 is a process flow diagram of a method for servicing channel change requests in a digital video network that is capable of distributing digital video content to clients via multicasting and unicasting.

FIG. 20 is a process flow diagram of a method for servicing channel change requests in a digital video network that is capable of distributing digital video content to clients via multicasting and unicasting. At decision point 2002, it is determined whether or not a channel change request has been detected. If no channel change request has been detected, then the process returns to decision point 2002. Once a channel change request is detected, at block 2004, digital video content related to the requested channel is provided to a client using FEC for a limited initial period. At decision point 2006, it is determined whether or not the limited initial period has ended. Actions that may trigger the end of the limited initial period include, for example, when a buffer at the client is populated to a pre-established threshold, the expiration of a pre-established time interval, or when digital video content related to the requested channel is switched from being provided to the client via unicasting to being provided to the client via multicasting. If the limited initial period has not ended, then digital video content related to the requested channel continues to be provided to the client using FEC. In an embodiment, the stream rate is increased above the playout rate simultaneously with the use of FEC in order to fill the client buffer. Once the limited initial period ends, at block 2008, the use of FEC is ended while digital video content related to the requested channel continues to be provided to the client. In an embodiment, the stream rate is reduced back down to the playout rate after FEC is ended and a retransmission protocol is used as an error protection mechanism instead of FEC. In an alternative embodiment, the process of FIG. 20 is not specific to servicing a channel change request and decision point 2002 involves determining if a new stream of digital video content is to be provided to a client. Once it is determined that a new stream of digital video content is to be provided to a client, the process proceeds to block 2004.

Figure 21:
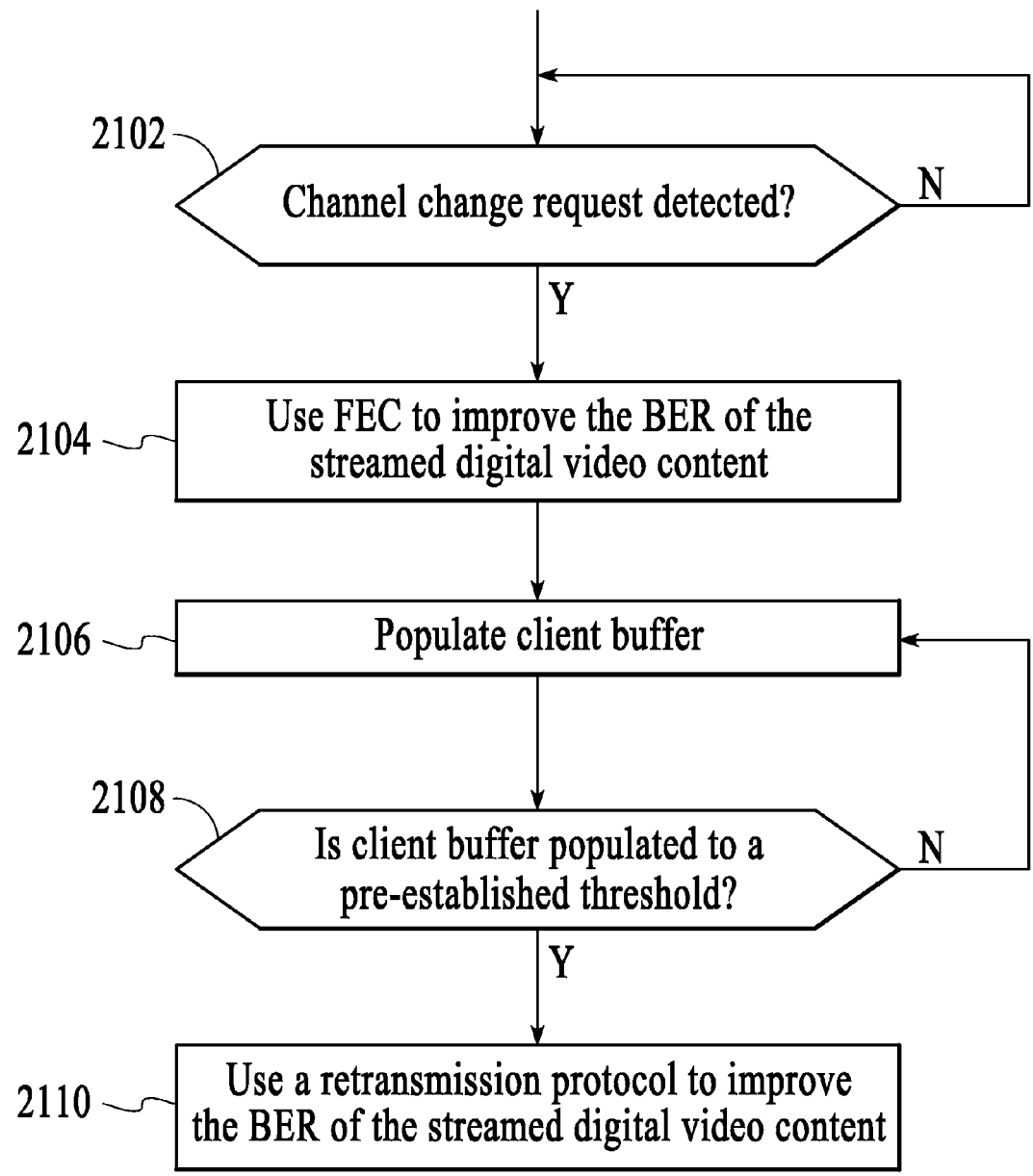
FIG. 21 is a process flow diagram of another method for servicing channel change requests in a digital video network that is capable of distributing digital video content to clients via multicasting and unicasting.

FIG. 21 is a process flow diagram of another method for servicing channel change requests in a digital video network that is capable of distributing digital video content to clients via multicasting and unicasting. At decision point 2102, it is determined whether or not a channel change request has been detected. If no channel change request has been detected, then the process returns to decision point 2102. Once a channel change request is detected, at block 2104, FEC is used to improve the BER of the streamed digital video content. At block 2106, a client buffer is populated. For example, the client buffer is populated by temporarily increasing the stream rate above the playout rate. At decision point 2108, it is determined whether or not the client buffer is populated to a pre-established threshold. If the client buffer is not populated to the pre-established threshold, then the process of populating the buffer continues. Once the client buffer is populated to the pre-established threshold, at block 2110, a retransmission protocol is used to improve the BER of the streamed digital video content. In an embodiment, once the client buffer is populated to the pre-established threshold, FEC is ended simultaneously with the switch to relying on a retransmission protocol as the error protection mechanism instead of FEC. In an alternative embodiment, the process of FIG. 21 is not specific to servicing a channel change request and decision point 2102 involves determining if a new stream of digital video content is to be provided to a client. Once it is determined that a new stream of digital video content is to be provided to a client, the process proceeds to block 2104.

Figure 22:
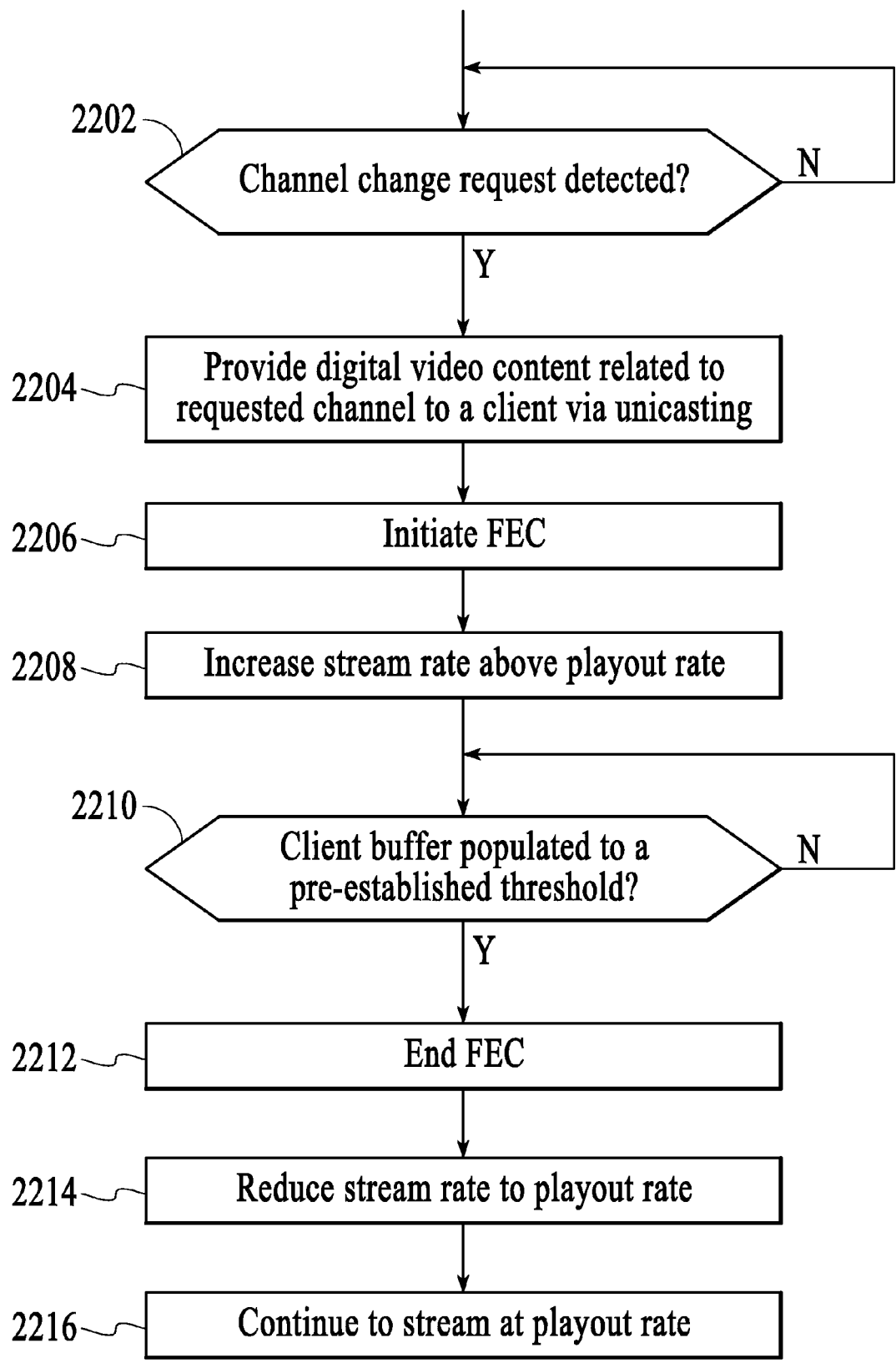
FIG. 22 is a process flow diagram of another method for servicing channel change requests in a digital video network that is capable of distributing digital video content to clients via multicasting and unicasting.

FIG. 22 is a process flow diagram of another method for servicing channel change requests in a digital video network that is capable of distributing digital video content to clients via multicasting and unicasting. At decision point 2202, it is determined whether or not a channel change request has been detected. If no channel change request has been detected, then the process returns to decision point 2202. Once a channel change request is detected, at block 2204, digital video content related to the requested channel is provided to a client via unicasting. At block 2206, FEC is initiated. For example, FEC is initiated simultaneously with transmission of the first frame related to the requested channel. At block 2208, the stream rate of the digital video content is increased to above the playout rate. For example, the stream rate is increased by a few percent (e.g., 1-10%) above the playout rate. At decision point 2210, it is determined whether or not the client buffer is populated to a pre-established threshold. If the client buffer is not populated to the pre-established threshold, then the buffer continues to be populated as a result of the increased stream rate. Once the client buffer is populated to the pre-established threshold, at block 2212, FEC is ended and at block 2214, the stream rate of the digital video content is reduced to the playout rate. At block 2216, the digital video content continues to be streamed at the playout rate after FEC is ended. In an alternative embodiment, the process of FIG. 22 is not specific to servicing a channel change request and decision point 2202 involves determining if a new stream of digital video content is to be provided to a client. Once it is determined that a new stream of digital video content is to be provided to a client, the process proceeds to block 2204.

In an embodiment, the pre-established threshold related to the client buffer can be changed in response to criteria such as transmission time, link performance, BER, desired quality of service, etc. The change can be manually or automatically triggered and can be done on a static or dynamic basis.

Figure 23:
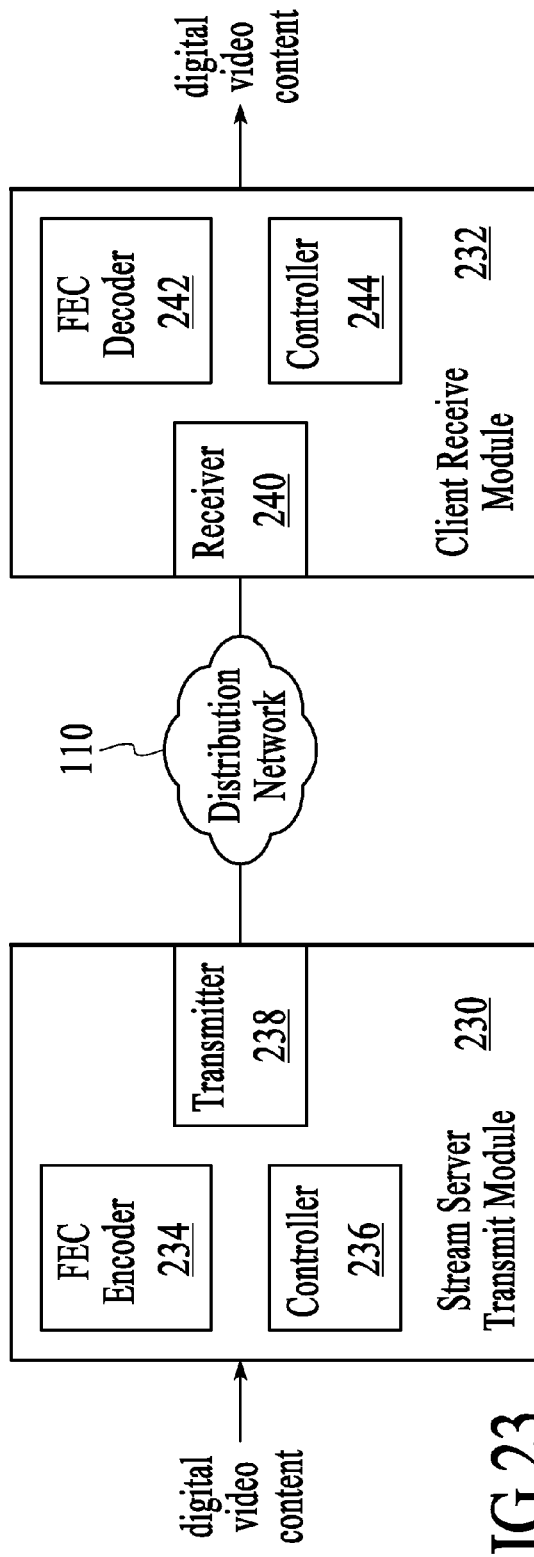
FIG. 23 depicts an embodiment of a stream server transmit module that resides on the stream server side of the digital video network and a client receive module that resides on the client side of the digital video network.

As described above, digital video content is streamed to a client using FEC for a limited initial period. In order to use FEC as an error protection mechanism, an embodiment of the digital video network 100 includes an FEC encoder and an FEC decoder. FIG. 23 depicts an embodiment of a stream server transmit module 230 that resides on the stream server side of the digital video network and a client receive module 232 that resides on the client side of the digital video network. The stream server transmit module includes an FEC encoder 234, a controller 236, and a transmitter 238 and the client receive module includes a receiver 240, an FEC decoder 242, and a controller 244. The stream server transmit module and the client receive module may include additional functional elements as is known in the field. On the stream server side, the FEC encoder encodes digital video content using an FEC protocol. The particular FEC protocol is not critical to the invention and many different types of FEC protocols can be used. The controller on the stream server side controls whether or not FEC encoded digital video content is transmitted to the client. For example, the controller determines whether or not FEC encoded digital video content is transmitted to the client as described above with reference to FIGS. 16-22. In an embodiment, the controller on the stream server side makes decisions about the use of FEC in response to feedback from the client (e.g., channel change requests and/or buffer status information). On the client side, the FEC decoder decodes digital video content using an FEC decoding protocol that corresponds to the FEC encoding protocol used at the stream server side. In an embodiment, FEC is triggered when a new stream of digital video content is provided to a client. For example, the stream server automatically initiates FEC upon transmitting each new stream to a client. In an embodiment, the controller on the client side indicates to the stream server when to end FEC. For example, in one embodiment, FEC is initiated immediately upon a channel change request and ended in response to an indication from the client that the client buffer is sufficiently populated. In an embodiment, the client can independently control when to use retransmission as an error correction technique. That is, the client controller can initiate retransmission whether or not FEC is in use. The FEC encoder, stream server controller, FEC decoder, and client controller can be embodied as hardware, software, firmware, or a combination thereof. In an embodiment, the FEC encoder and FEC decoder are embodied in application-specific encoding and decoding integrated circuits and the controllers are embodied in software.

The client receive module 232 can determine whether or not a received stream includes FEC using various techniques. In one embodiment, the receive module knows that FEC is being used when FEC codes are identified. Once the FEC codes are no longer present in the stream, the client receive module can initiate a retransmission protocol for error protection. Other techniques that may be used by the client receive module to determine whether or not FEC is being used include placing an FEC indicator such as a flag in frame headers or providing FEC status information to the client via an out-of-band protocol such as the Real-time Streaming Protocol (RTSP).

In an embodiment, the strength of the FEC protocol is application-specific. The BER is generally a function of the strength of the FEC protocol, with stronger FEC protocols utilizing more redundant data that results in a lower BER. Further, the strength of the FEC protocol generally corresponds to the bandwidth requirement of the FEC protocol, with stronger FEC protocols requiring more bandwidth. In an embodiment, the FEC is selected to provide a BER in the range of 10-12, where a lower BER generally translates to higher quality digital video content. The strength of the FEC can be dynamically adjusted based on, for example, feedback related to the quality of the corresponding transport path.

In an embodiment, FEC can be applied to retransmissions of data. That is, even after FEC has ended for the transmission of the primary stream of digital video content, FEC may be used for the retransmission of data that is triggered by lost or damaged frames. The decision on whether or not to use FEC for the retransmission of data and the strength of the FEC protocol can be dynamically selected based on, for example, network conditions.

Although the above-described technique for maintaining the quality of streaming digital video content is described in the context of servicing channel change requests, the technique is applicable to any situation in which a new stream of digital video content is being provided to a client and/or a new stream session is setup. For example, a new stream of digital video content may be provided to a client when a channel change is initiated or when a new stream of digital video content is spliced into an existing stream (e.g., client-specific advertising content). In the general case of a new stream, an embodiment of the technique involves first identifying a new stream of digital video content that is intended for a client, e.g., in response to a channel change request or a splice of new content, such as a commercial or interactive content, into an existing stream. Once a new stream is identified, streaming of the previous stream ends, the client immediately flushes all buffered digital video content related to the previous stream, and digital video content corresponding to the new stream is provided to the client using FEC for a limited initial period. After the limited initial period, the use of FEC is ended. In an embodiment, during the initial limited period, the digital video content for the new stream is provided to the client at a rate that is higher than the playout rate (e.g., the buffer trickle). The increased rate above the playout rate enables a client buffer to accumulate digital video content related to the new stream. In an embodiment, the limited initial period ends once the client buffer is populated to a pre-established threshold. Once FEC ends, the quality of the streamed digital video content is maintained using a retransmission protocol instead of FEC.

Real-time Transport Protocol (RTP) is a packet-based protocol that is widely used to stream video media. RTP Control Protocol (RTCP) is a control protocol for use with RTP. The combination of RTP and RTCP is often referred to together as "RTP/RTCP." The above-described techniques for maintaining the quality of streaming digital video content are especially applicable to a streaming environment that utilizes RTP with RTCP negative acknowledgements. Typical RTP/RTCP schemes require a client to wait for the client buffer to grow large enough to sustain negative acknowledgements (e.g., NAK/receive-transmitted-frame). As described above with reference to FIG. 15, the wait time can be reduced by sending an initial burst of digital video content. In contrast to typical RTP/RTCP schemes, the above-described techniques use FEC for error protection during a limited initial period and then switch to a retransmission protocol after the client buffer has been sufficiently filled. The client buffer is filled by an increase in the stream rate (e.g., 1-10%) above the playout rate that is much smaller than a typical burst rate (e.g., greater that 30% above the playout rate).

Figure 24:
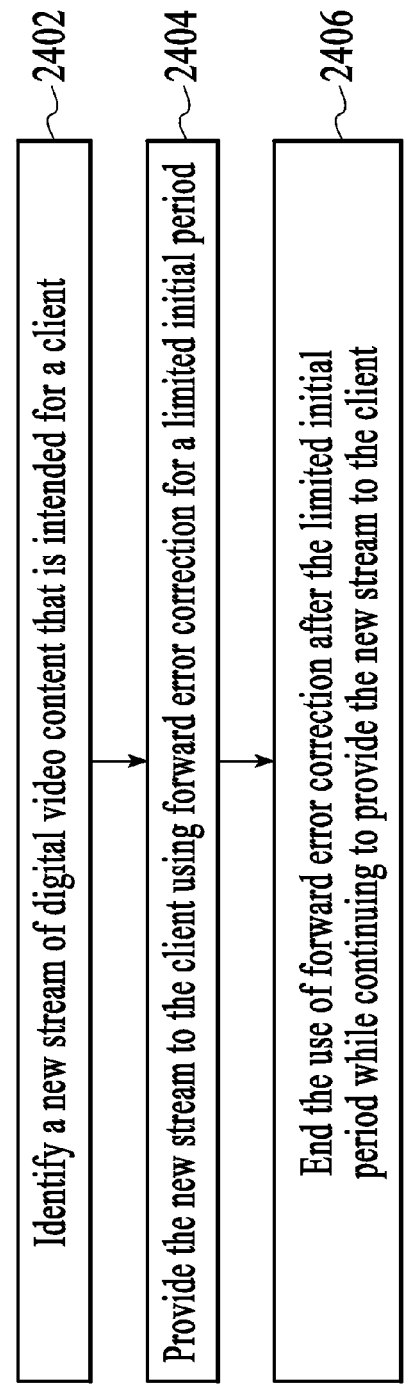
FIG. 24 is a process flow diagram of a method for streaming digital video content to a client in a digital video network.

FIG. 24 is a process flow diagram of a method for streaming digital video content to a client in a digital video network. At block 2402, a new stream of digital video content that is intended for a client is identified. At block 2404, the new stream is provided to the client using forward error correction for a limited initial period. At block 2406, the use of forward error correction is ended after the limited initial period while the new stream continues to be provided to the client.

The above-described technique for using FEC for a limited initial period is applicable to constant bit rate (CBR) or variable bit rate (VBR) traffic. The above-described technique is not limited to RTP/RTCP schemes and is applicable to any technique that enables identification of content transmission blocks and retransmission with reference to specific transmission blocks.

In an embodiment, encapsulation of both FEC and non-FEC encoded digital video content is equivalent from a framing perspective, e.g., when used in an RTP environment. For example, when a sequence of frames that was previously provided to a client using FEC is subsequently retransmitted to the client, the same sequence of frames will arrive at the client except without FEC encoding.

In an embodiment, at the end of the limited initial period, instead of ending FEC all together, the strength of the FEC can be reduced. Reducing the strength of the FEC reduces the bandwidth usage and processing utilization contributed from FEC while still providing some degree of error correction. In this case, the strength of the FEC that is used after the limited initial period is a balance between bandwidth usage, processing utilization, and the desired level of error correction.

Although specific embodiments of the invention have been described and illustrated, the invention is not to be limited to the specific forms or arrangements of parts as described and illustrated herein. The invention is limited only by the claims.

What is claimed is:

1. A method for streaming digital video content to clients in a digital video network, the method comprising:
    identifying a new stream of digital video content that is intended for a client;
    providing the new stream to the client using forward error correction for a limited initial period; and
    ending the use of forward error correction after the limited initial period while continuing to provide the new stream to the client.

2. The method of claim 1 further comprising, while forward error correction is in use, providing digital video content to the client at a rate that is higher than the playout rate at the client in order to populate a buffer at the client.

3. The method of claim 2 wherein the limited initial period ends once the buffer is populated to a pre-established threshold.

4. The method of claim 2 further comprising reducing the rate at which digital video content is provided to the client to the playout rate and initiating a retransmission protocol once the limited initial period ends.

5. The method of claim 1 wherein the limited initial period ends when a buffer at the client is populated to a pre-established threshold.

6. The method of claim 5 wherein the pre-established threshold is a function of the time required to recover a frame at the client using a retransmission protocol.

7. The method of claim 5 wherein the pre-established threshold provides enough buffered digital video content to enable a frame to be recovered at the client before the frame is due for playout at the client.

8. The method of claim 1 wherein the limited initial period ends upon the expiration of a pre-established time interval.

9. A method for servicing channel change requests in a digital video network that is capable of distributing digital video content to clients via multicasting and unicasting, the method comprising:
    detecting a channel change request related to a client;
    providing digital video content related to the requested channel to the client in response to the channel change request, wherein providing digital video content to the client comprises using forward error correction for a limited initial period; and
    ending the use of forward error correction after the limited initial period while continuing to provide digital video content related to the requested channel to the client.

10. The method of claim 9 further comprising, while forward error correction is in use, providing digital video content to the client at a rate that is higher than the playout rate at the client in order to populate a buffer at the client.

11. The method of claim 10 wherein the limited initial period ends once the buffer is populated to a pre-established threshold.

12. The method of claim 11 further comprising reducing the rate at which digital video content is provided to the client to the playout rate once the buffer is populated to the pre-established threshold.

13. The method of claim 9 wherein the limited initial period ends when a buffer at the client is populated to a pre-established threshold.

14. The method of claim 13 wherein the pre-established threshold is a function of the time required to recover a frame at the client using a retransmission protocol.

15. The method of claim 13 wherein the pre-established threshold provides enough buffered digital video content to enable a frame to be recovered at the client before the frame is due for playout at the client.

16. The method of claim 10 further comprising initiating a retransmission protocol once the limited initial period ends.

17. The method of claim 9 wherein the limited initial period ends when digital video content related to the requested channel is switched from being provided to the client via unicasting to being provided to the client via multicasting.

18. A method for servicing channel change requests in a digital video network that is capable of distributing digital video content to clients via multicasting and unicasting, the method comprising:
  detecting a channel change request related to a client;
  providing digital video content related to the requested channel to the client in response to the channel change request, wherein providing digital video content to the client comprises using forward error correction for a limited initial period to improve the bit error ratio of digital video content received at the client; and
  after the limited initial period, using a retransmission protocol to improve the bit error ratio of digital video content received at the client.

19. The method of claim 18 further comprising, before the end of the limited initial period, providing digital video content to the client at a rate that is greater than the playout rate at the client.

20. The method of claim 18 wherein the limited initial period ends when a buffer at the client is populated to a pre-established threshold.

21. The method of claim 18 further comprising ending the use of forward error correction after the limited initial period.

22. The method of claim 18 further comprising reducing the strength of forward error correction after the limited initial period.

23. A system for streaming digital video content to clients in a digital video network, the system comprising:
  a processor; and
  memory, the memory storing a transmit module configured to;
    provide digital video content related to a new stream to a client using forward error correction for a limited initial period; and
    end the use of forward error correction after the limited initial period while continuing to provide digital video content related to the new stream to the client.

24. The system of claim 23 wherein the limited initial period ends when a buffer at the client is populated to a pre-established threshold and wherein the pre-established threshold provides enough buffered digital video content to enable a frame of the new stream to be recovered at the client using a retransmission protocol before the frame is due for playout at the client.

25. The system of claim 24 wherein the transmit module is further configured to reduce the rate at which digital video content is provided to the client to the playout rate once the buffer is populated to the pre-established threshold.

26. The system of claim 23 wherein the transmit module is further configured to provide, while forward error correction is in use, digital video content to the client at rate that is higher than the playout rate at the client in order to populate a buffer at the client.

27. The system of claim 23 wherein the transmit module is configured to use a retransmission protocol once the limited initial period ends.

* * * * *